(12) United States Patent
Elbaum

(10) Patent No.: US 7,505,259 B2
(45) Date of Patent: Mar. 17, 2009

(54) CD ROM STORAGE DEVICE

(75) Inventor: Hector Daniel Elbaum, Ringwood (AU)

(73) Assignee: Opdicom Pty Ltd., Mulgrave (AU)

( * ) Notice: Subject to any disclaimer, the term of this patent is extended or adjusted under 35 U.S.C. 154(b) by 442 days.

(21) Appl. No.: 10/478,652

(22) PCT Filed: May 28, 2001
(Under 37 CFR 1.47)

(86) PCT No.: PCT/AU01/00631

§ 371 (c)(1),
(2), (4) Date: Jan. 26, 2006

(87) PCT Pub. No.: WO02/097808

PCT Pub. Date: Dec. 5, 2002

(65) Prior Publication Data

US 2006/0187771 A1    Aug. 24, 2006

(51) Int. Cl.
*H05K 5/00* (2006.01)
*H05K 7/00* (2006.01)
*G11B 7/085* (2006.01)
*G11B 21/08* (2006.01)
*G11B 19/00* (2006.01)
*G11B 21/12* (2006.01)

(52) U.S. Cl. .................. 361/685; 369/24.01; 369/30.64; 369/30.7; 369/30.71; 369/30.72; 369/30.86; 369/30.9

(58) Field of Classification Search .................. 361/685; 369/30.01, 30.38–30.45, 30.48, 30.5–30.57, 369/30.6, 30.62, 30.64, 30.7, 30.71, 30.85, 369/30.86, 24.01, 36.01, 37.01, 30.72, 30.9; 360/69, 71, 92; 312/9.9, 9.29, 9.31

See application file for complete search history.

(56) References Cited

U.S. PATENT DOCUMENTS

| 4,609,232 | A | * | 9/1986 | Florence | 312/9.31 |
| 4,791,626 | A | * | 12/1988 | Staar | 369/30.86 |

(Continued)

FOREIGN PATENT DOCUMENTS

DE    43 04 699 A1    7/1993

(Continued)

*Primary Examiner*—Jayprakash N Gandhi
*Assistant Examiner*—Anthony M Haughton
(74) *Attorney, Agent, or Firm*—Bromberg & Sunstein LLP

(57) ABSTRACT

CD storage device is disclosed which includes a housing (12) in which a carousel (40) is supported for rotation in the housing. The carousel has a number compartments (85) each for storing a CD. The device includes a controlling circuit board (46) which can couple with a computer so that CDs can be stored and retrieved by inputting information into the computer which causes the carousel to rotate to present the storage compartment having the required CD at an opening for discharge. The device (10) includes an ejector (96) for ejecting CDs from a storage compartment (85). The storage device (10) may include a reader (210) into which CDs can be loaded for reading and then restored in the device so that the CDs can be used without the user needing to remove a CD from the device and locate it in a reader in the user's computer. The reader enables CDs to move linearly through the reader so that CDs can be stored by inserting them through the reader and ejected completely from the device by again passing through the reader in the opposite direction.

64 Claims, 25 Drawing Sheets

U.S. PATENT DOCUMENTS

| | | | | |
|---|---|---|---|---|
| 4,815,057 A | * | 3/1989 | Miller et al. | 369/30.86 |
| 5,123,000 A | | 6/1992 | Fitzgerald et al. | 369/36 |
| 5,598,385 A | * | 1/1997 | Mizukami et al. | 369/30.01 |
| 5,933,395 A | | 8/1999 | Dang | 369/34 |
| 5,953,293 A | * | 9/1999 | Kajiyama et al. | 369/30.86 |
| 6,456,572 B1 | * | 9/2002 | Sakamoto | 369/30.56 |
| 6,603,715 B1 | * | 8/2003 | Klein | 369/30.86 |
| 6,714,490 B2 | * | 3/2004 | Ostwald | 369/30.5 |
| 6,820,271 B2 | * | 11/2004 | Schafer | 720/600 |
| 6,895,592 B2 | * | 5/2005 | Matsumura et al. | 720/601 |
| 2006/0239135 A1 | * | 10/2006 | Klein | 369/30.86 |
| 2007/0291597 A1 | * | 12/2007 | Lee et al. | 369/30.62 |

FOREIGN PATENT DOCUMENTS

| | | |
|---|---|---|
| EP | 0 838 816 A1 | 9/1997 |
| JP | 2000-048449 | 2/2000 |
| JP | 2000-260098 | 9/2000 |

* cited by examiner

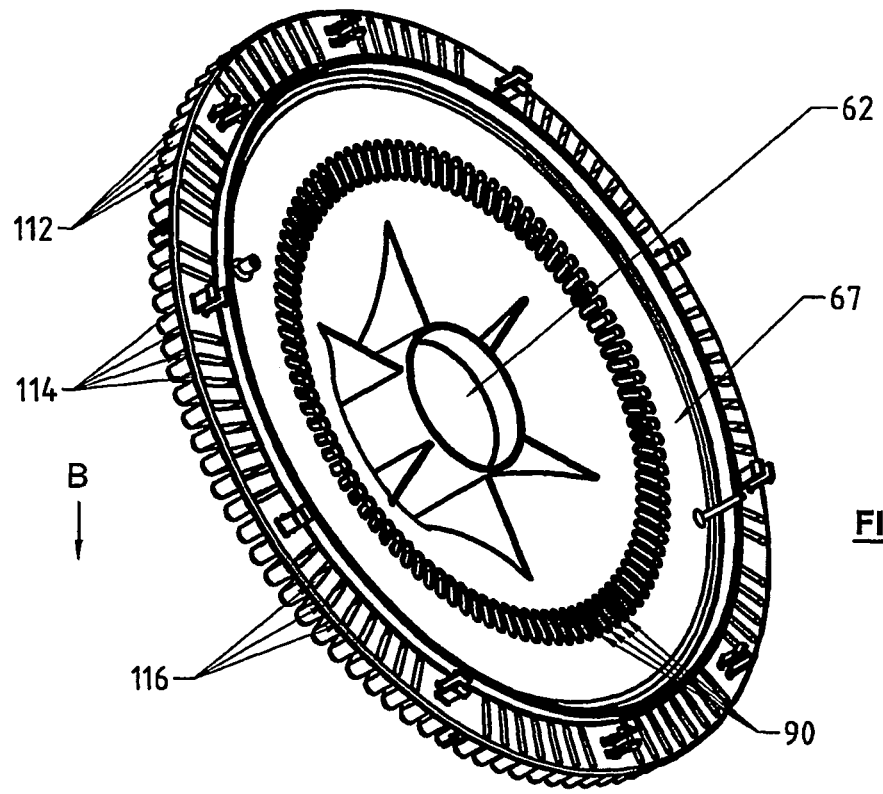
FIGURE 7
FIGURE 8
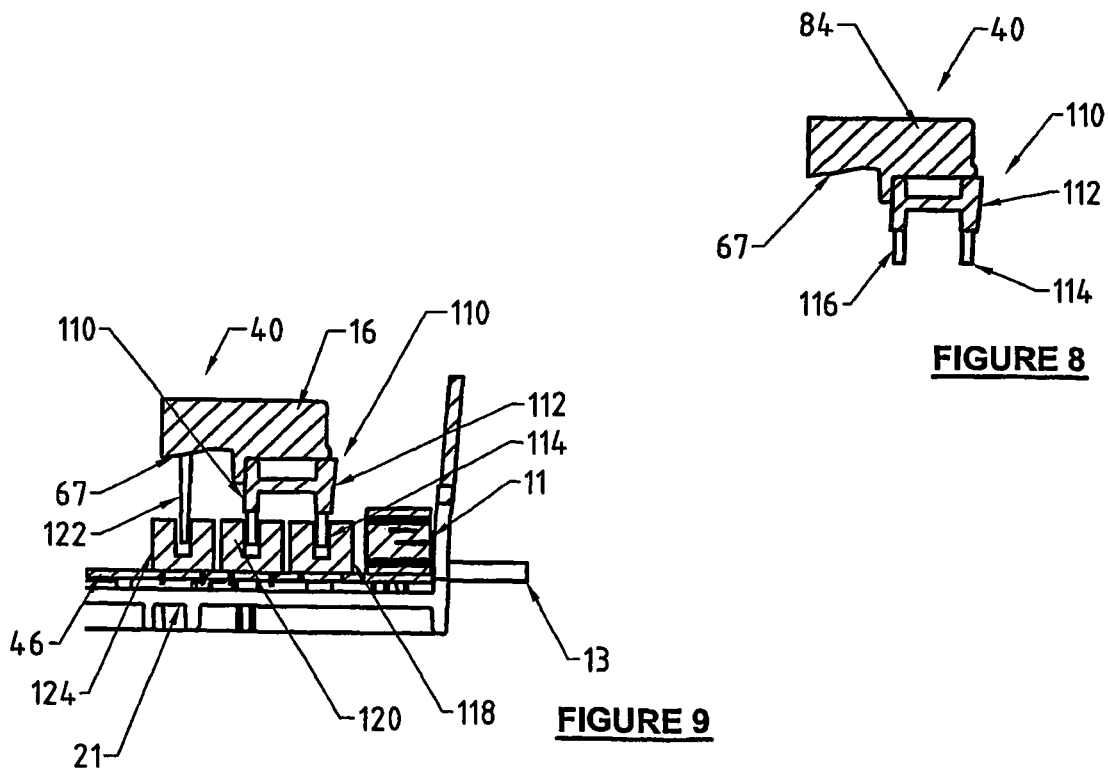
FIGURE 9

CD ROM STORAGE DEVICE

FIELD OF THE INVENTION

This invention relates to a storage device for storing programmed or programmable medium, such as a CD ROM, which is to be used with a computer such as a personal computer.

BACKGROUND ART

As is well known, programs stored on CD ROM are commonly used with computers. Typically, the CD ROMS are stored in a storage rack or box and the computer includes a CD reader into which a CD ROM is inserted.

Generally, in order to run a program stored in a CD ROM, the operator will click on an icon on the screen on the computer in order to initiate running of the program. However, the operator must also locate the relevant CD ROM and insert the CD ROM into the CD ROM reader of the computer. The computer can then read and/or write onto the CD ROM and run the program in accordance with the software contained on the CD ROM, or interact with data or software contained on the CD ROM under the control of software or data included in the PC.

The handling of CD ROMS, particularly if an operator has a large number of CD ROMs, can therefore be time consuming and bothersome because of the number of CD ROMs which need to be stored and then the number which may have to be flicked through in order to provide the program the operator wishes to run.

The object of the present invention is to address this problem.

SUMMARY OF THE INVENTION

The invention in a first aspect provides a storage device for a programmable or programmed medium, said device including;
a housing;
a storage member in the housing and having a plurality of storage compartments each for receiving a said medium;
an outlet opening in the housing through which the medium can pass for location in one of the storage compartments;
drive means for driving the storage member relative to the housing to present one of the storage compartments and therefore a medium stored in that storage compartment in registry with the opening;
control means including coupling means for coupling the control means with a computer so that data can be supplied from the coupling means to the computer and received from the computer to operate the control means; and
wherein a storage medium can be stored in the device by inserting a medium through the opening into one of the storage compartments, the control means determining or providing information as to the compartment in which the medium is stored, so that when the medium is required for operation, an operator can select the medium by input into the computer whereupon information is transmitted to the control means to control the control means to move the storage member relative to the housing to present the required medium to the outlet opening.

Thus, in order for the operator to store medium such as CD ROMs, the CD ROMs can be loaded into the device and the storage location of each CD ROM remembered so that when the user requires a CD ROM it is only necessary for the user to put an input into the computer, such as clicking on an icon in the computer, whereupon data relating the required medium is supplied to the control means so that the control means operates the device to move the storage member relative to the housing and present the storage medium at the outlet opening so that storage medium can then be used by the operator.

Preferably the device includes ejector means for ejecting the medium from the storage compartment when the storage compartment is in registry with the outlet opening.

Preferably the ejector means comprises;
a lever member; and
a solenoid, coupled to the control means, for activation by the control means to cause the solenoid to contact the lever and move the lever to push the medium from the storage compartment through the outlet opening.

Preferably the storage member is a rotatable carousel.

Preferably the carousel is rotated by the drive means and the housing remains stationary.

Preferably the carousel is mounted on a plurality of roller wheels.

Preferably the drive means comprises a gear ring arranged about the periphery of the carousel, a worm drive and motor connected to the housing, the worm drive being in mesh with the gear ring, the drive motor being electrically connected to the control means so that the control means can drive the drive motor to rotate the worm drive and therefore rotate the carousel.

Preferably the carousel and housing includes locating means for monitoring the amount of rotation of the carousel, the locating means being coupled to the control means so that the control means receives data as to the position of the carousel so the carousel can be driven to present the required storage compartment in registry with the opening.

Preferably the device includes a first electrical connector in a base portion of the housing and a second electrical connector in a top portion of the housing, so that a plurality of the devices can be stacked one upon the other with the first electrical connector of one device making electrical connection with the second electrical connector of another of the devices so that data from the computer can be supplied to any one of the devices for controlling the carousel in any one of the devices to present a required storage compartment having the required medium to the outlet opening of the respective device regardless of which of the stacked devices stores the required medium.

This embodiment of the invention enables the capacity of the storage facility to be increased by stacking a number of the devices one upon the other and for electrical signals to be transmitted between all the devices and the computer by virtue of the first and second electrical connector.

In this embodiment all of the devices will include the electrical coupling for connection with the computer. However, only one of the electrical couplings need to be used, usually the coupling located on the bottom device, for connecting the stacked storage devices to the computer.

In the first embodiment of the invention the medium is presented at the outlet opening and manually located in a reader associated with the computer.

However, in a second embodiment of the invention the storage device also includes a reader for receiving the selected medium for reading from and/or writing onto the storage medium without the user having to remove the medium and locate the medium in a reader associated with the computer.

In this embodiment the reader is electrically coupled to the coupling means so that data can be supplied from the reader or to the reader from the coupling means and to and from the coupling means to the computer.

Thus, in this embodiment of the invention after the medium is stored in the device no further manual removal and location of the medium is required in order to read from or write onto the medium.

Preferably the reader includes a first entry opening so that medium can be supplied from a storage compartment to the reader, and a second entry opening so that the medium can be located into the device and compartment through the second entry opening of the reader and then through the first entry opening of the reader into a storage compartment, and whereupon when it is desired to read the medium or write onto the medium the drive means rotates the carousel to present the required storage compartment and therefore the required medium to the opening in the housing and the ejector means ejects the medium from the compartment through the opening of the housing, through the first entry opening of the reader and into the reader for reading.

Preferably the reader includes medium drive means for selectively driving the medium from the first or second entry opening into the reader for reading or writing by the reader or from the first opening through the reader to the second opening, or from the second opening through the reader to the first entry opening.

Preferably the ejector is located beneath the carousel and the carousel has a plurality of holes registering with each of the compartments so that when the ejector means is operated the lever can move through one of the holes to make contact with the medium and therefore push the medium from the storage compartment to the opening of the housing.

Preferably the carousel includes a first carousel portion having a plurality of ribs which define spaces therebetween, the spaces forming each of the storage compartments, and a second carousel portion also including a plurality of ribs which are in alignment with the plurality of ribs on the first portion and between which are defined spaces, the spaces of the first carousel portion and the spaces of the second carousel portion defining the storage compartments so the storage medium can be located in one of the compartments by parts of the storage medium locating in one of the spaces of the first carousel portion and the aligned space of the second carousel portion.

Preferably the first and second carousel portions have a central hub which connect together to join the first and second portions together.

The carousel portions may also include upstanding posts at a peripheral portion of the carousel for supporting the peripheral portion of the first and second carousel portions with respect to one another.

The invention also provides a storage device for a programmed or programmable medium, the storage device including;

a housing;

a storage member arranged in the housing for movement relative to the housing, the member having a plurality of storage compartments each for storing a respective said medium;

drive means for driving the carousel relative to the housing;

a reader for receiving a storage medium from one of the compartments and for reading from or writing onto the storage medium;

coupling means for coupling the reader to a computer so that data from the medium can be supplied to the computer or data from the computer supplied to the medium; and control means for controlling movement of the storage member relative to the housing so that when an input commanded is input into the computer, data can be supplied from the computer to the control means to cause the control means to move the storage member relative to the housing to present a required medium to the reader for reading from and/or writing onto the medium.

Preferably the storage member is a rotatable carousel and the carousel is rotated by the drive means and the housing remains stationary.

Preferably the carousel is mounted on a plurality of roller wheels.

Preferably the drive means comprises a gear ring arranged about the periphery of the carousel, a worm drive and motor connected to the housing, the worm drive being in mesh with the gear ring, the drive motor being electrically connected to the control means so that the control means can drive the drive motor to rotate the worm drive and therefore rotate the carousel.

Preferably the carousel and housing includes locating means for monitoring the amount of rotation of the carousel, the locating means being coupled to the control means so that the control means receives data as to the position of the carousel so the carousel can be driven to present the required storage compartment in registry with the opening.

Preferably each device includes a first electrical connector in a base portion of the housing and a second electrical connector in a top portion of the housing, so that a plurality of the devices can be stacked one upon the other with the first electrical connection of one device making electrical connector with the second electrical connector of another of the devices so that data from the computer can be supplied to any one of the devices for controlling the carousel in any one of the devices to present a required storage compartment having the required medium to the outlet opening of the respective device regardless of which of the stacked devices stores the required medium.

Preferably the reader includes a first entry opening so that medium can be supplied from a storage compartment to the reader, and a second entry opening so that the medium can be located into the device and compartment through the second entry opening of the reader and then through the first entry opening of the reader into a storage compartment, and whereupon when it is desired to read the medium or write onto the medium the drive means rotates the carousel to present the required storage compartment and therefore the required medium to the opening in the housing and the ejector means ejects the medium from the compartment through the opening of the housing, through the first entry opening of the reader and into the reader for reading.

Preferably the reader includes medium drive means for selectively driving the medium from the first or second entry opening into the reader for reading or writing by the reader or from the first opening through the reader to the second opening, or from the second opening through the reader to the first entry opening.

Preferably an ejector is provided for ejecting the medium from one of the compartments of the carousel the ejector is located beneath the carousel and the carousel has a plurality of holes registering with each of the compartments so that when the ejector is operated the lever can move through one of the holes to make contact with medium and therefore push the medium from the storage compartment to the opening of the housing.

Preferably the carousel includes a first carousel portion having a plurality of ribs which define spaces therebetween, the spaces forming each of the storage compartments, and a second carousel portion also including a plurality of ribs which are in alignment with the plurality of ribs on the first portion and between which are defined spaces, the spaces of the first carousel portion and the spaces of the second carousel portion defining the storage compartments so the storage medium can be located in one of the compartments by a part of the storage medium locating in one of the spaces of the first carousel portion and the aligned space of the second carousel portion.

Preferably the first and second carousel portions have a central hub which connect together to join the first and second portions together.

The carousel portions may also include upstanding posts at a peripheral portion of the carousel for supporting the peripheral portion of the first and second carousel portions with respect to one another.

The invention, in a further aspect, provides a programmable or programmed medium reader or writer including;

a reading and/or writing unit for reading from or writing onto a medium;

a first entry opening;

a second entry opening linearly aligned with the first entrance opening so that the medium can be inserted through the first opening and into the reader and then exit the second opening, or alternatively enter the second opening and exit the first opening; and drive means for driving the medium out of either the first or second opening.

This aspect of the invention provides a reader which can be used with a storage device so that a storage medium can be retrieved from the storage device and loaded into the reader through the first entry opening, selectively read in the reader and the exit the reader through the second entry opening for collection by a user, or be returned to the storage medium through the first entry opening, or alternatively, be loaded into the reader and storage device through the second entry opening, through the reader and then into the first entry opening.

Preferably the drive means comprises two drive rollers, one of the drive rollers being located adjacent the first entry opening and the other of the drive rollers being located against the second entry opening, clamping means for clamping the medium between the clamping means and the first roller or second roller, and drive means for driving the first and second rollers in the required direction to move the medium from the first entry opening towards the second entry opening or from the second entry opening towards the first entry opening.

Preferably the drive means comprises two drive motors, each drive motor being coupled to a respective roller for rotating the roller.

Preferably the drive motors are coupled to the respective rollers by a worm drive connected to an output of the respective motors and a gear mounted on each roller.

Preferably the clamping means is moveable from a clamping position which clamps a medium to the drive rollers so rotation of the drive rollers can drive the medium through the reader, to an open position allowing insertion of the medium into the first or second entry opening.

In one embodiment of the invention the first entry opening may comprise an open end of the reader which is mounted to a medium storage device so that when the medium passes through the first entry opening the medium can pass through an opening in the storage device.

Preferably the second entry opening comprises an entry slot in an end wall of the reader opposite the open end of the reader.

The invention in a further aspect may be said to reside in storage device for a programmed or programmable medium, the storage device including;

a housing;

movement relative to the housing, the storage member having a plurality of separate storage compartments each for storing one of the said medium;

a reader and/or writer for receiving medium from the storage member and for reading from the medium or writing onto the medium;

control means for controlling movement of the storage member for presenting one of the medium to the reader;

electrical coupling means coupled to the control means for connecting the control means to a computer;

an electrical connector on the housing for enabling a plurality of the devices to be electrically connected together;

wherein a plurality of said storage devices are enabled to be coupled together by interconnecting the connector of one storage device with the connector of another storage device so that information from any medium stored in any one of the storage devices can be read and supplied to the computer by the electrical coupling means.

Preferably at least one the readers of one of the separate storage devices has a read/write head so that information on a storage medium stored in one of the other devices can be read by the reader associated with that device and written onto one of the medium selected from a compartment in the storage member of the other said storage device.

Preferably the storage device includes a housing and the housing has an opening through which the storage medium can pass to locate the storage medium in one to the compartments or allow retrieval of the storage medium from one of the compartments for presentation to the reader for presentation to the reader.

In one embodiment of the invention two separate arrays of storage devices are provided, the storage device in one array having the opening aligned with the opening of a storage device in the other array, the storage devices including ejector means for ejecting a medium through the opening so that a medium can be ejected from one storage device through the opening and into the opening of the adjacent storage device.

In this embodiment of the invention the storage devices preferably include a reader, the reader having an opening and, wherein the openings of two adjacent readers on two adjacent storage devices are located in alignment with one another so that a storage medium stored in one of the devices can be ejected by an injector means into the reader and then transferred from the reader through the opening associated with that reader and into the opening associated with the adjacent reader, and then from that reader into the other said storage device.

Preferably each reader includes drive means for driving a storage medium through the reader either from the opening of the reader to a storage compartment in the device or from a storage compartment in the storage member to the reader and out of the opening.

Preferably the reader includes a second opening which is arranged adjacent the opening of the housing of the storage device.

In the preferred embodiment of the invention the second opening may merely comprise an open end wall of the reader which aligns with the opening of the housing so that the storage medium can pass from the first opening through the reader and into the storage member and vice versa.

Preferably the drive means comprises a plurality of rollers for driving the medium through the reader, the rollers being coupled to motors for rotating the rollers in a first direction to drive the medium in a first direction from the first opening, through the second opening and into the storage member and for rotating the rollers in a second direction for driving the medium from the storage member through the second opening and then through the first opening of the reader.

BRIEF DESCRIPTION OF THE DRAWINGS

Preferred embodiments of the invention will be described, by way of example, with reference to the accompanying drawings in which;

FIG. 7 is an underneath view (at a reduced scale) of the carousel;

FIG. 8 is a cross-sectional view along the line B-B of FIG. 7;

FIG. 9 is a view showing the mounting of a locating part of the carousel with respect to a circuit board in the preferred embodiment;

DESCRIPTION OF THE PREFERRED EMBODIMENTS

Figure 1:
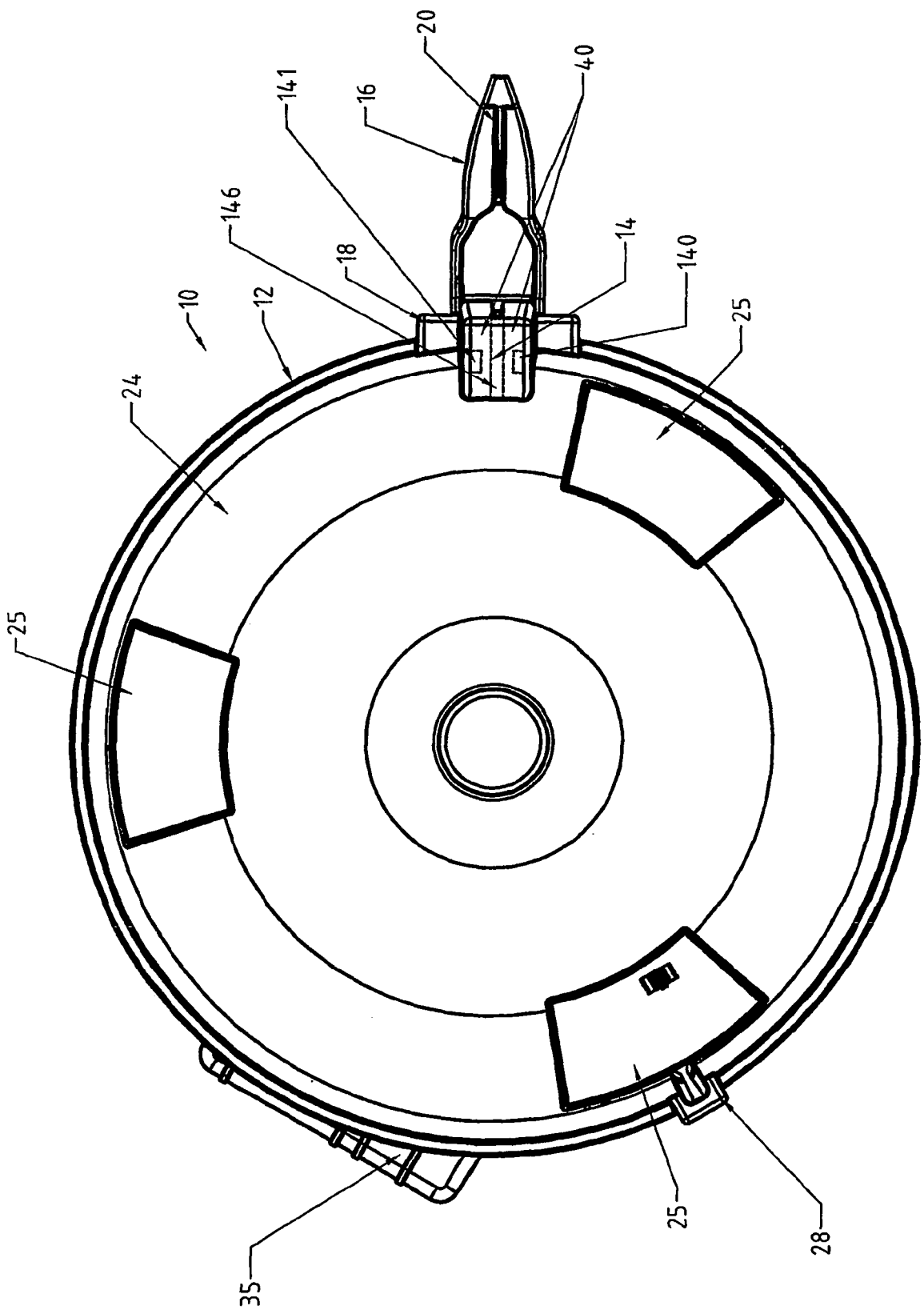
FIG. 1 is a plan view a storage device according to a first embodiment of the invention.
Figure 2:
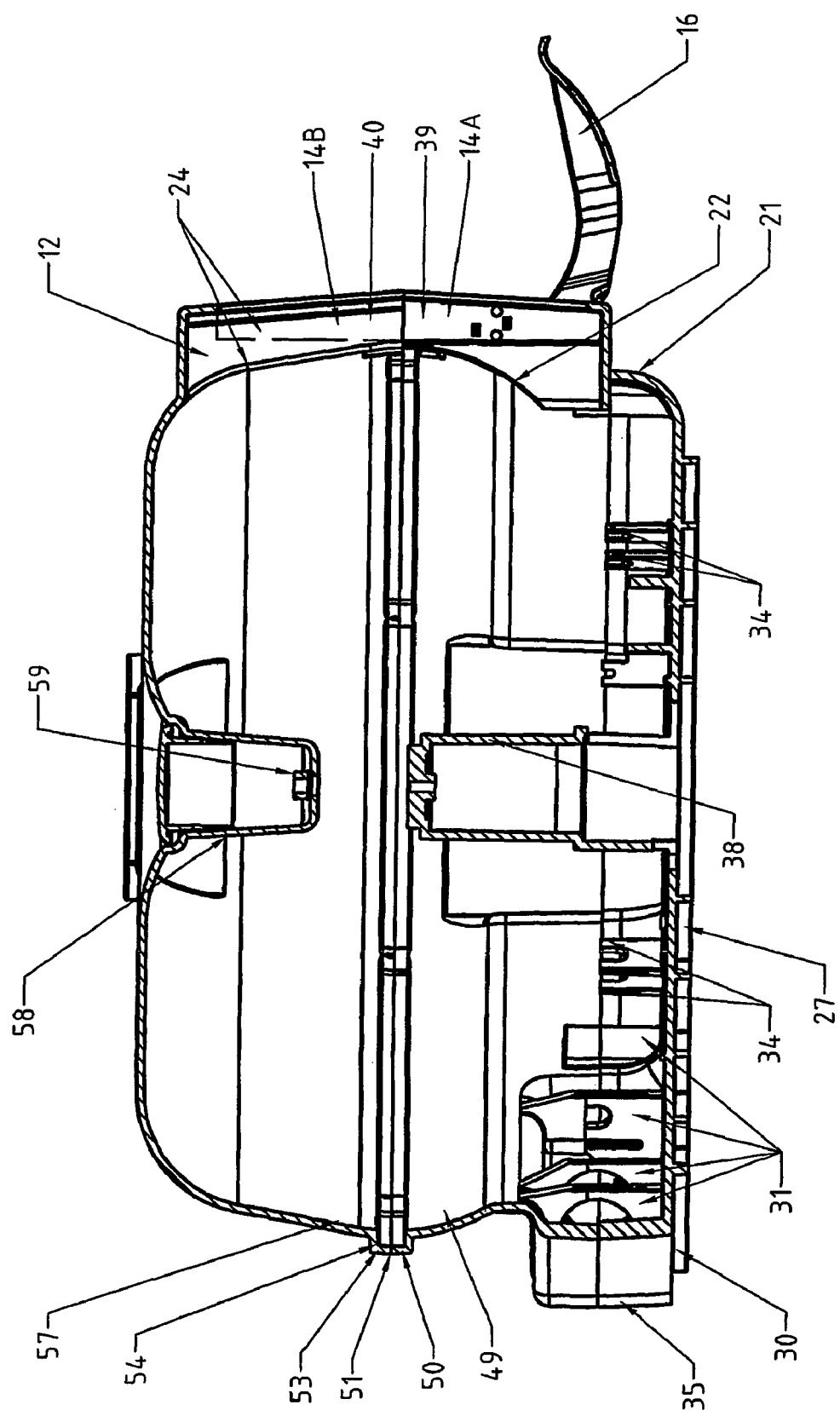
FIG. 2 is a cross-sectional view along the line A-A of FIG. 1 but with internal componentary removed so as to show the housing structure of the device.

FIGS. 1 and 2 show a storage device 10 according to one embodiment of the invention. The storage device 10 comprises an outer housing 12 which has an inlet/outlet opening 14. A catch bracket 16 is arranged below the opening 14 for catching and holding a CD ROM 100 (see FIG. 13) ejected from the device 10 as will be described in more detail hereinafter. The bracket 16 is pivotally coupled to the housing 12 and in particular to a boss section 18 which defines the opening 14. The bracket 16 may have a longitudinal slot 20 in which the CD ROM can register so as support the CD ROM when the CD ROM is ejected through the opening 14 onto the bracket 16.

The housing 10 is generally defined by a base section 21 a lower housing section 22 and a top housing section 24 (all of which can be seen FIG. 2). The top housing section 24 shown in FIG. 1 includes three flat platforms 25 which provide a rest surface so that a number of the devices shown in FIGS. 1 and 2 can be stacked one above the other as will also be disclosed in more detail hereinafter. The underneath surface 27 of the base section 21 can include a plurality of shallow recesses molded in to the underneath surface 27 which register over the platforms 25 to facilitate stable stacking of the plurality of devices.

The top section 24 has a first electrical connector which comprises a socket connector and the base section 21 includes a second connector 30 which comprises a plurality of pins so that when a number of the devices 10 are stacked one upon the other the pins of the second connector 30 engage with the sockets of the first connector 28 so as to electrically connect the stacked devices together as will be described in more detail hereinafter.

Figure 3:
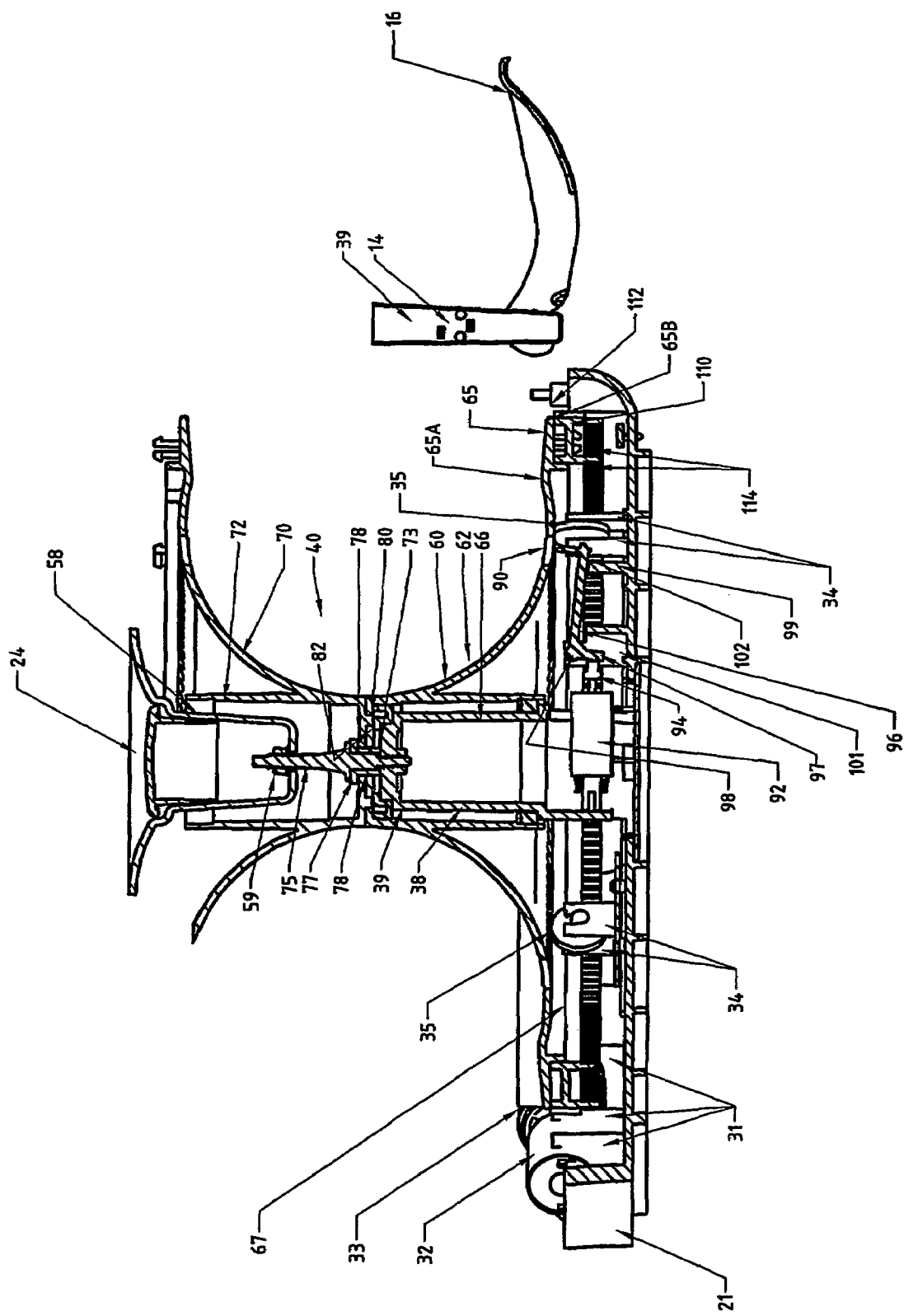
FIG. 3 is a view of the internal componentary of the device according to the first embodiment of the invention.

As best shown in FIG. 2 the base section 21 includes a plurality of lugs 31 for supporting a motor 32 and worm screw 33 (see FIG. 3). The base section 21 also has number of lug pairs 34 which support roller wheels 35 (see FIG. 3).

The motor 32 and worm screw 33 may be partly accommodated in a boss section 35 which forms part of the base section 21 and lower housing section 22.

The base section 21 has an upstanding stem 38 which will support a carousel 40 (see FIG. 3) for rotation relative to the housing 12.

The lower housing section 22 is of generally cylindrical configuration and defines first part 14a of the opening 14 which comprises a slit or slot in the periphery of the housing section 22. The remainder of the opening 14 is formed by a slit or slot 14b in the top section 24 which registers with the portion 14a. The slot 14a can be best seen in FIG. 4. The lower section 22 and top section 24 may include a pair of wall structures 39 and 40 (only one of each shown in FIG. 2) which define the slots 14a and 14b which form the opening 14.

The base section 21 and bottom section 22 may be secured together by seating the bottom section 22 onto the base section 21 and screwing the two section together by screws 43 (see FIG. 4) which pass through molded bosses 45 formed on the inner periphery of the sections 21 and 22. Obviously a plurality of the bosses 45 are provided around the periphery of the device only two of which are shown in FIG. 54.

Figure 4:
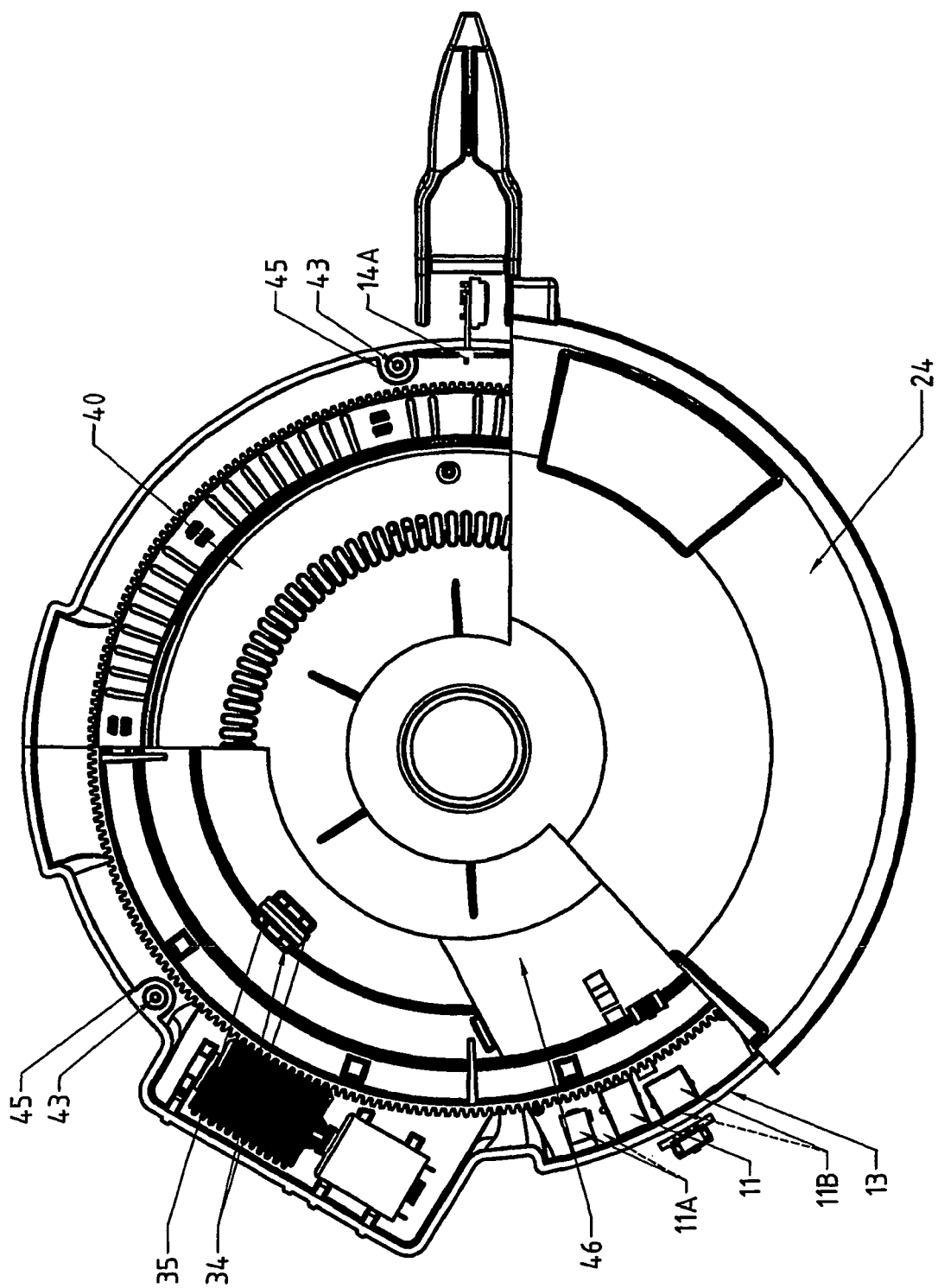
FIG. 4 is a plan view of the device partly broken away in cross-section so as to reveal some of the disposition of the internal componentary of the device.

The base section 21 supports a printed circuit board schematically shown by a reference 46 in FIG. 4. The printed circuit board contains the control electronics (which will be described in more detail hereinafter) for operating the device. An electric cable schematically illustrated by reference 49 in FIG. 2 extends from the printed circuit board to an intermediate connector 50 formed in a molded boss 51 at the upper periphery of the bottom section 22. The top section 24 includes a molded boss 53 which registers with the boss 51 and includes a second intermediate connector 54 for coupling with the connector 51. The second intermediate connector 54 has a wire lead 57 which extends to the connector 28 previously described. The printed circuit board 46 also has a lead (not shown) which extends to the connector 30 shown in FIG. 2.

The bottom section 22 and top section 24 are coupled together by locating the top section 24 on the bottom section 22 so that the bosses 51 and 52 register and the connectors 51 and 54 make electrical interconnection with one another. The top section 24 may have a plurality of holes about its lower periphery and the bottom section 22 a plurality of stems extending up from its periphery which locate in the holes so as to couple the sections 22 and 24 together by friction so that the sections can be properly located and removed from one another for maintenance if necessary.

The top section 12 includes a depending stem 58 which is in alignment with the stem 38 but spaced from the stem 38 as best shown in FIG. 2. In order to securely couple the housing section 22 to the housing section 24 a shaft 75 (FIG. 3) extends from the stem 58 to the stem 38 and is then secured in place by a nut 59. In order to remove the section 24 the nut 59 is undone and then the top section 24 can simply be lifted off the bottom section 22.

FIG. 3 shows the base section 21 and internal structure of the device but omits the bottom section 22 and top section 24 for clarity and ease of illustration (apart from the small portion of the section 24 in the vicinity of the stem 58).

The circuit board 46 also carries electrical coupling means 11 for coupling the device 10 to a computer. The coupling means 11 may include or comprise two different types of connector for connecting with the computer by two different connection leads. The connector 11 may include an RS 232 connector which can connect with a lead 13 (see FIG. 9). A second connector of a different type may also be used so that the board 46 can be connected to the computer by a different type of connection and lead if desired or required. The connectors are mounted on the board 46 as previously described and part of the board can register with a hole 13 formed in the base portion 21 so that cable can be inserted through the hole and plug into the connector 11. The other connectors are labelled 11a and 11b in FIG. 4 for illustrative purposes and access can be gained to them through holes 11a and 11b also formed in the base section 21 so that the appropriate connector leads can be inserted through those holes to join with the connectors 11a and 11b if those connectors are to be used. The different types of connectors simply provide different types of connection to the computer depending on the requirements of the user and the computer with which the device 10 will be used.

The connectors 11, 11a, 11b connect the circuit board 46 and controlling electronics with the lead wire 49 and connectors 50 and 54 and therefore with lead wire 57 extends to connector 28. The board also connects with connector 30 so that signals transmitted to the board from the computer via the electrical coupling formed by the connectors 11, 11a or 11b and signals produced by the controlling electronics on the board 46 can also supplied to the connectors 30 and 28 for transmission to other devices if a number of the devices are stacked one above the other.

The carousel 40 comprises a first portion 60 which in cross section as shown in FIG. 3 has a generally curved profile defined generally by a curved upper section 62 which curves down to a more generally flat section 63. The carousel 60 has a recess central hole 66 which sits on the stem 38 so as to support the carousel 40 for rotation in the housing 10. The carousel 40 has a bottom surface 67 which sits on the roller wheels 35 so as to also support the carousel 40 for rotation. The carousel 40 also has an upper portion 70 which in general is a mirror image of the bottom portion 60. As previously explained the shaft 75 joins the top section 24 to the bottom section 22 by passing through flat portion 73 of the section 70 and contacting flat portion 78 of the portion 70. The shaft 75 can screw into a screw threaded hole 39 in the stem 38 and the nut 59 can be screw threaded onto the other end of the shaft 75 so as to securely hold the sections 22 and 24 together. The carousel 40 is able to rotate on the shaft 75 and a bush 77 may be located in the holes through the flat surfaces 73 and 78 so as to allow rotation of the carousel 40 relative to the shaft 75. The flat portions 73 and 78 may include a plurality of pins 80 which locate in holes 82 in the other of the flat portions 73 and 78 to assist in securely coupling the portions 60 and 70 of the carousel 40 together.

Figure 5:
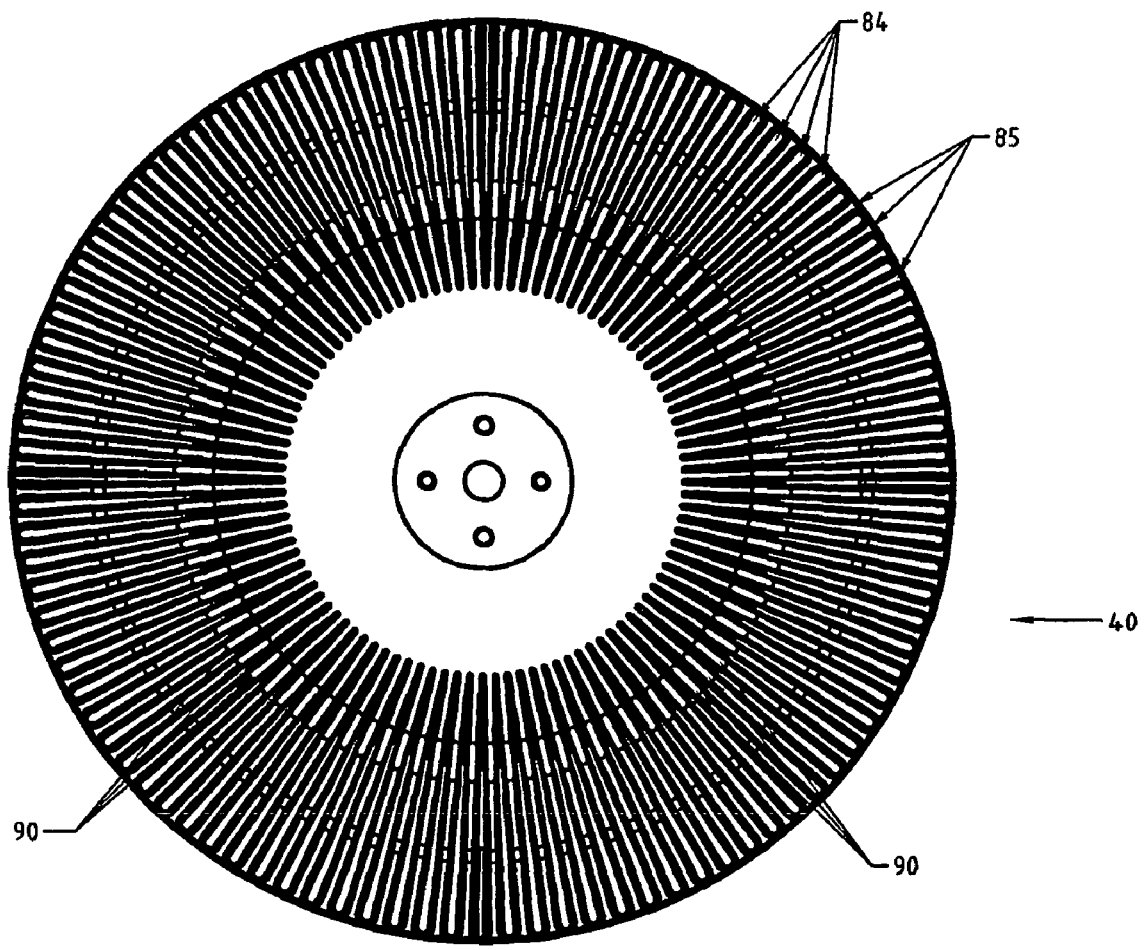
FIG. 5 is a plan view of part of a carousel used in the preferred embodiment of the invention.

As is best shown in FIG. 5 the carousel 40 has a plurality of radial extending ribs 84 which define between them gaps or spaces 85. Each of the spaces 85 defines a storage location for a CD ROM. The storage locations 85 can be most clearly seen in FIG. 6.

Figure 6:
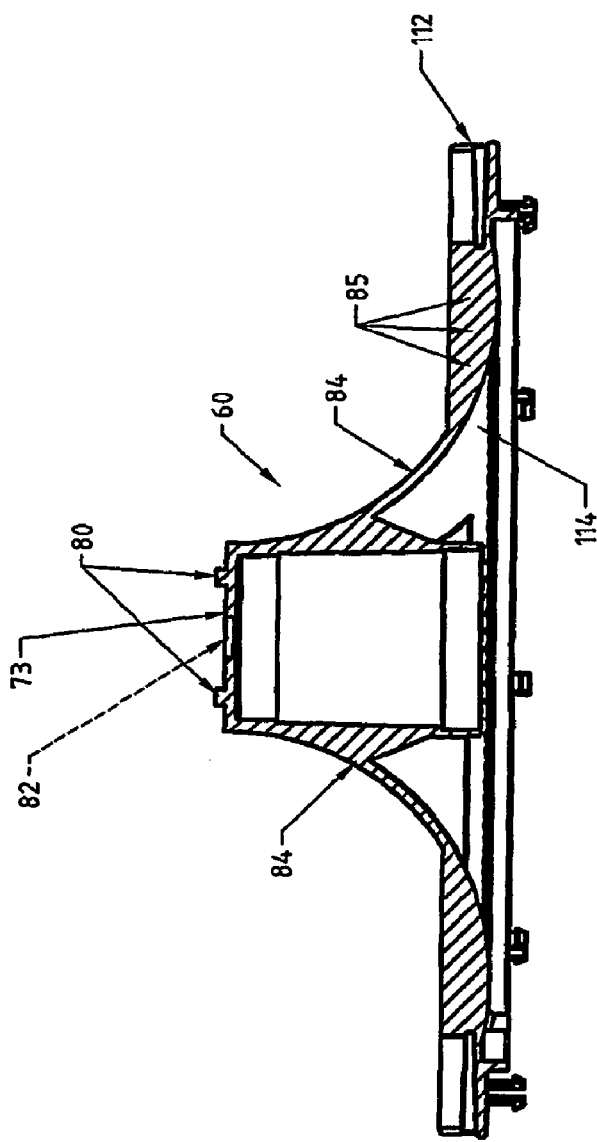
FIG. 6 is a side view of the part of the carousel shown in FIG. 5.
Figure 10:
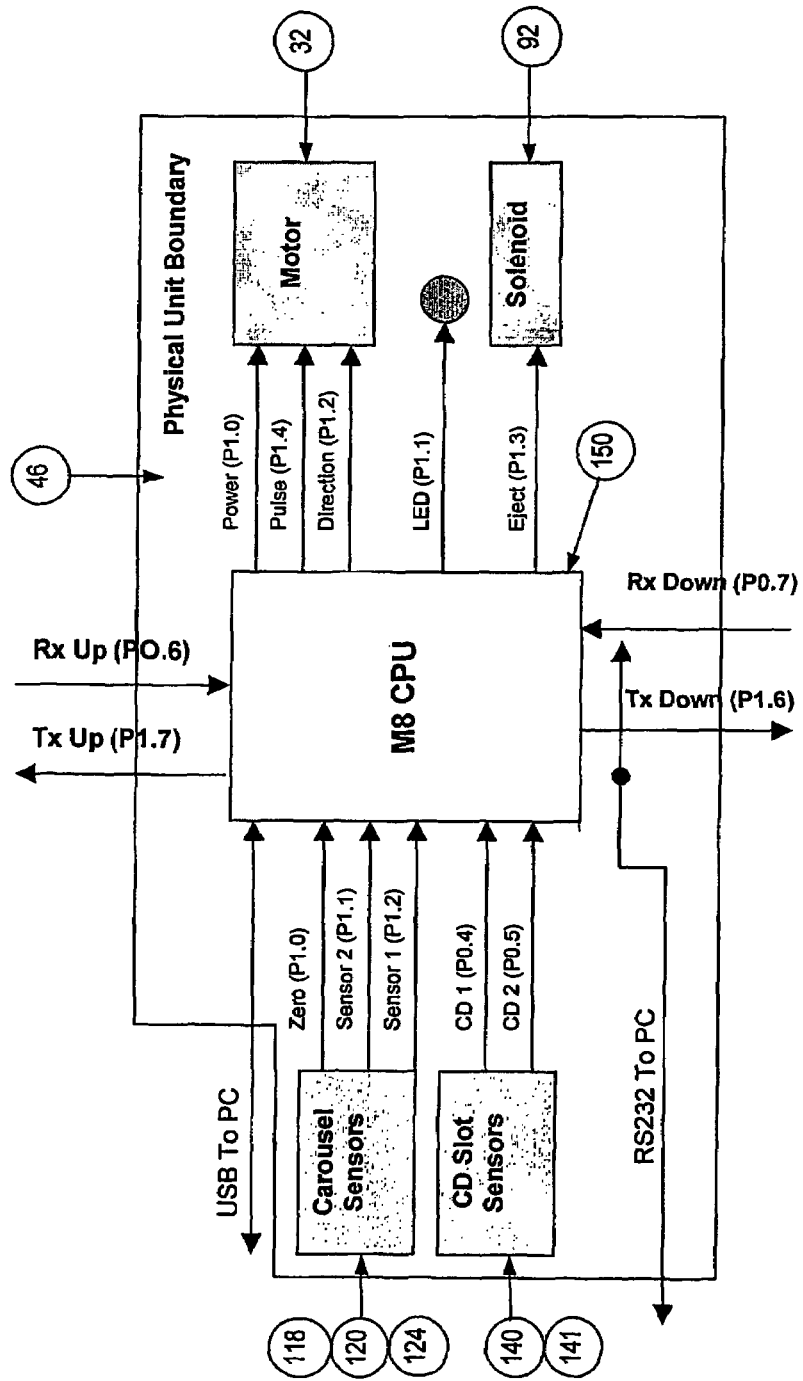
FIG. 10 is a circuit block diagram illustrating operation of the first embodiment of the invention.
Figure 11:
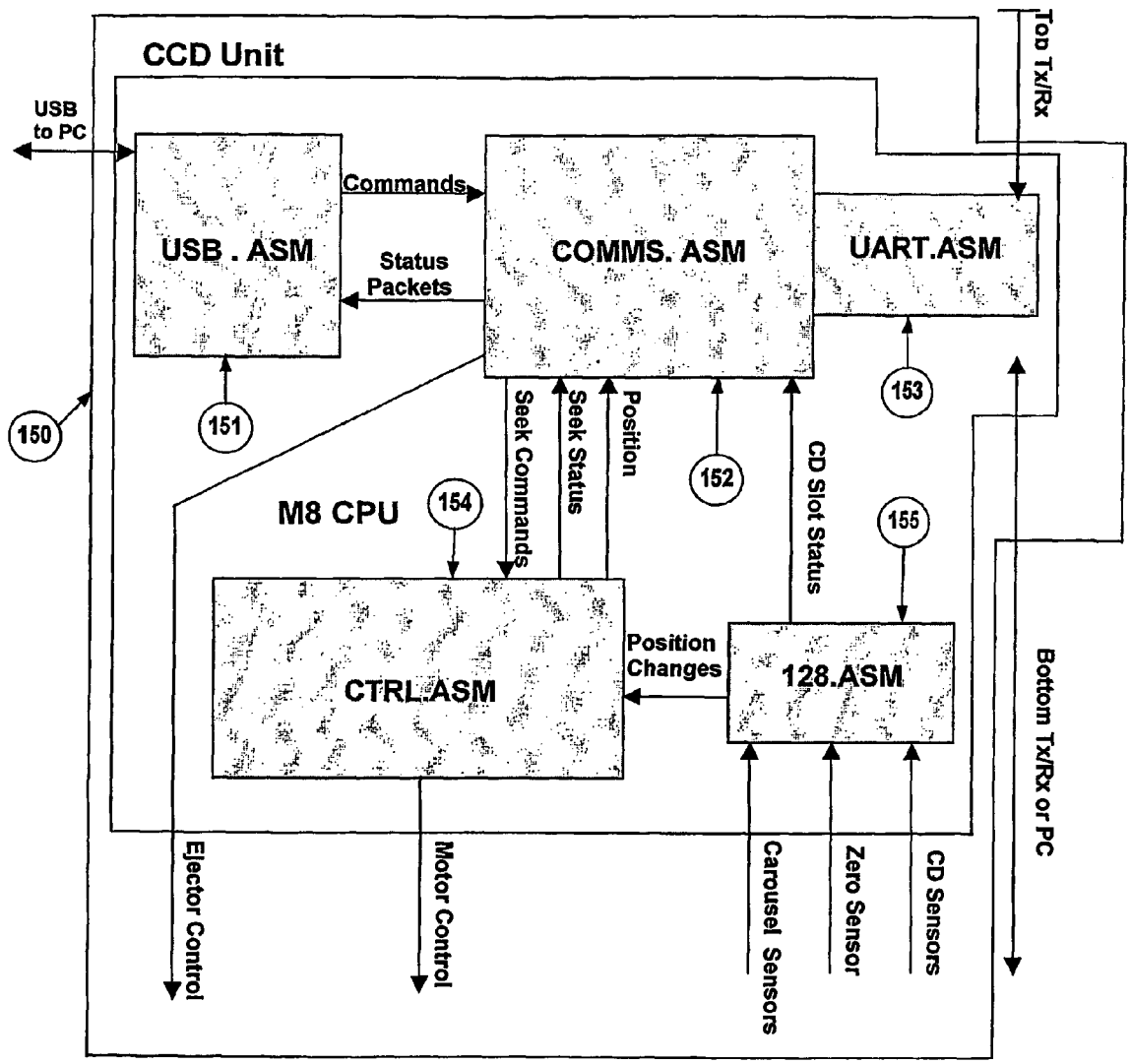
FIG. 11 is a diagram explaining the functional modules of a processor according to the first embodiment of the invention.

As will be evident from consideration of FIGS. 3, 5 and 6 the carousel 40 defines a plurality of radially extending storage compartments 85 defined between the ribs 84 which are of generally semi-circular contour (as best seen in FIG. 3) with a peripheral part of a compact disc being able to be supported in the space 85 between adjacent ribs 84. FIG. 10 to be described in more detail hereinafter shows a CD ROM 100 in the carousel 40 and supported in one of the storage compartments.

The carousel 40 has a plurality of openings or holes 90 in each of the spaces 85 in the lower portion 60 of the carousel 40. The holes 90 pass through bottom 67. Since the carousel portions 60 and 70 can be formed from the same molding the upper portion 70 can also include the holes 90 which perform no function in the upper portion 70.

Mounted in the stem 38 of the base section 21 is a solenoid 92 which has a plunger 94. A pivotally mounted lever 96 is pivoted on a boss 97 in the base section 21 on a pivot pin 98. An upwardly projecting pin 99 supports the lever 96 in the position shown in FIG. 3. When it is desired to eject a CD ROM from the storage compartment 84 the solenoid 92 is activated to push the plunger 94 so that the plunger contacts arm 101 of the lever 96. This causes the lever 96 to pivot in the direction of arrow C in FIG. 3 which pushes contact arm 102 up through hole 90 so as to contact the CD and push the CD out of the storage compartment through the opening 14 and into the bracket 16. The CD moves from the storage compartment to the outlet opening 14 by rolling on the surface 65 between the ribs 84. As best shown in FIG. 3 the surface 65 has a slight rise labelled 65a in FIG. 3 over which the CD will roll when pushed by the pin 102. The rise 65a assists in securely locating the CD in a storage compartment so that it cannot roll out and when the pin 102 pushes the CD it tends to roll the CD up over the rise 65a so the CD can then roll down slightly inclined surface portion 65b and out through the opening 14 in the bracket 16. The CD can then simply be taken by a user and placed in a CD reader of a computer so that program on the CD can be run or data can be written on the CD.

The carousel 40 has a ring 110 connected about its periphery which is molded at a separate unit and is connected to the remainder of the carousel 40 by screws or any other suitable fashion. The ring 110 has peripheral gear teeth 112 about its outer periphery which can engage the worm screw 33 to enable rotation of the carousel to take place. The ring 110 also has a first set of depending slightly spaced apart lugs 114.

As shown in the underneath view of the carousel 40 in FIG. 7 a concentric set of downwardly projecting lugs 116 are also provided and which are arranged inwardly of the lugs 114.

As best shown in FIG. 9 when the carousel 40 is mounted on the stem 38 the first set of circumferential extending lugs 114 pass through a first photo interrupter 118 mounted on the circuit board 46. The lugs 116 pass through a second photo interrupter 120 also mounted on the circuit board 46. The underside 67 of the carousel 40 also carries a single pin 122 which passes through a third photo interrupter 124. The single pin 122 is a homing pin which enables the carousel 40 to return to a home position which can be detected when the pin 122 breaks the light beam supplied by the photo interrupter 124 to thereby return the carousel to a home position at which the pin 122 registers with the photo interrupter 124.

The set of lugs 114 which pass through the photo interrupter 118 and the lugs 116 which pass through the photo interrupter 120 are slightly out of phase with one another and provide for increased sensitivity of measurement of the position of the carousel 40. Thus, the resolution which can be detected by the pair of photo interrupters 118 and 120 is considerably better than the spacing between adjacent lugs 114 or 116 because of the two measurements provided by the photo interrupters 118 and 120.

In order to use the embodiment of FIG. 1, the storage device is coupled to a computer such as PC by the electrical coupling connection 11 which is also mounted on the circuit board 46. As previously mentioned the coupling connection 11 can include two or more connectors for receiving a RS connector or other type of connector which can be coupled to the PC by the cable 13. When the user wishes to store a CD in the storage device 10, software relating to storage application is first loaded into the PC. This will act as the interface between the user and the device 10 to manage the installation of CD roms in the storage device, their location and retrieval. The user inputs data relating to the CD such as a short name of the CD or subject matter of the CD into the computer and that data is stored. The computer then controls the storage device to cause the control circuitry on the printed circuit board 46 to rotate the carousel 40 by driving the drive motor 32 and worm screw 33 which is in engagement with the gear teeth 112 so that carousel 40 is rotated to bring an empty storage compartment 85 into alignment with the opening 14. The CD RON can then be inserted through the opening into that storage compartment. The controller 24 will remember the position of the carousel 40 and either store that information in a memory in the control electronics in the circuit board 46 or supply to the PC for storage. Another CD ROM can be stored in a different storage compartment in the same manner. When it is desired to locate a particular CD ROM the user can either type into a keyboard of the PC or otherwise input into the PC the identifying title of the CD ROM. This will be found in the memory in the PC or on the circuit board 46 and the controlling electronics on the circuit 46 will rotate the carousel 40 to bring the storage compartment which stores that CD into registry with the opening 14. When the carousel 40 stops at the required location the solenoid 92 is operated so as to cause the plunger 94 to pivot the lever 96 in the direction of arrow C so that arm 102 passes through opening 90, contacts the CD in the respective storage compartment and rolls the CD out of the storage compartment through the opening 14 into the bracket 16. The CD can then be merely gripped by the user and inserted into the CD reader of the user's PC. Alternatively, rather than the user typing information into the keyboard, the PC could merely display an icon relating to that piece of software which can be clicked on by the user to identify the software and operate the carousel 40 to supply the required CD through the outlet 14 in the abovementioned manner.

The wall structures 39 (which appear below the wall structures 40 shown in FIG. 1) can include a further photo interrupter 140/141 which detects a CD passing through the opening 14 when the CD is ejected to provide an indication that the CD has been properly ejected by the ejection lever 96. The photo interrupter 140/141 is connected to the printed circuit board by an electrical cable which extends around the periphery of the bottom section 22. Most preferably the photo interrupter 140/141 is located in the wall structure 39 in the bottom section so it is not necessary to provide electrical interconnection between the section 22 and section 21 in order to operate the photo conductor 140/141.

With reference to FIG. 10 which shows a schematic block diagram of the circuit board 46 which carries the controlling electronics for the device 10. The circuit board 46 includes a central processing unit 150 which drives the solenoid 92 and also the motor 32 which in turn drives the worm screw 33. The photo interrupters 118, 120 and 124 also couple to processor 150. The photo interrupter 140/141 for sensing the CD passes through the opening 14 also couples to the processor.

Figure 12:
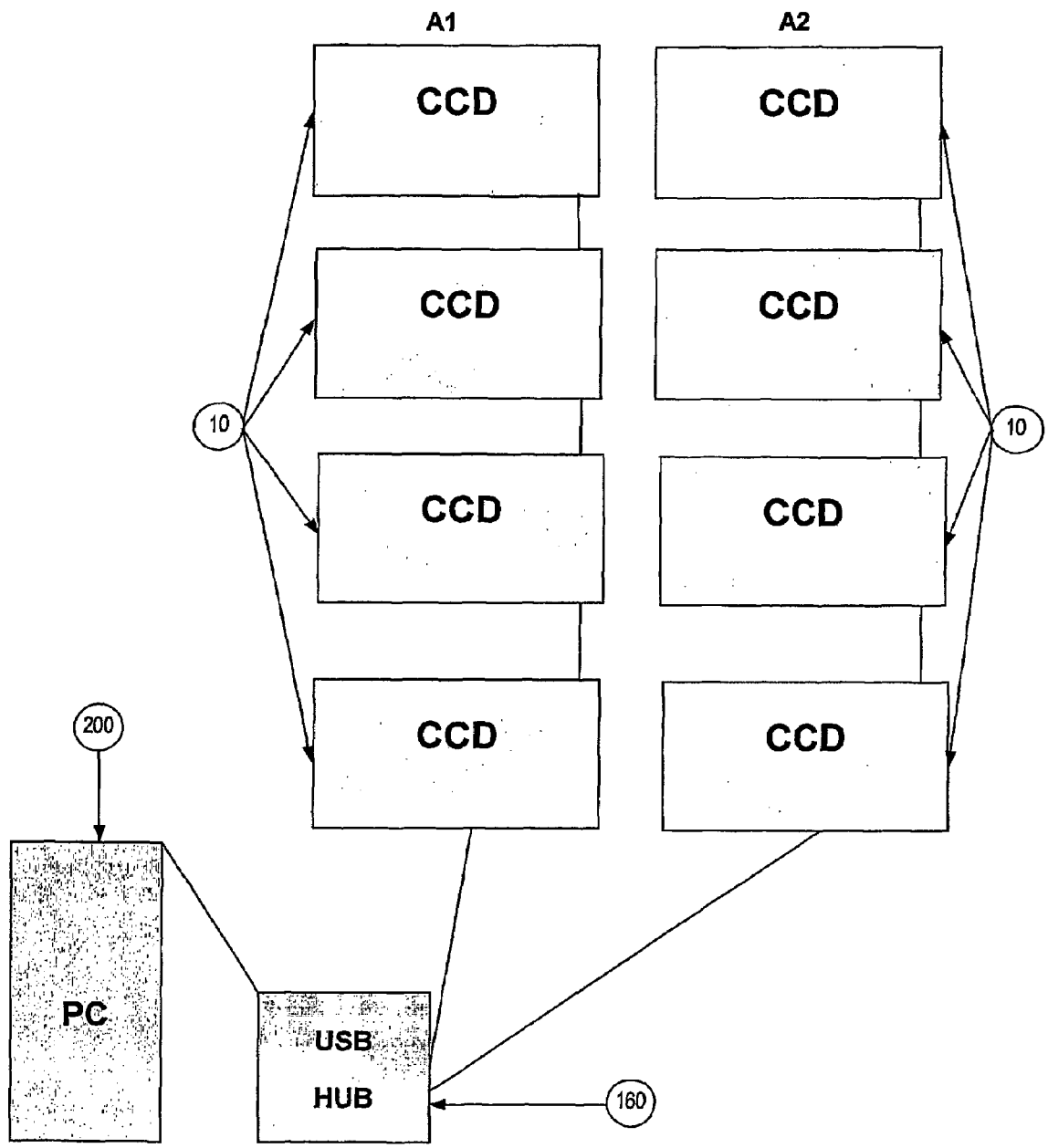
FIG. 12 is a diagram showing two arrays of stacked storage devices of the preferred embodiment which are coupled to a computer.

FIG. 12 shows an over view of the operating software of the microprocessor 150. The microprocessor 150 includes a number of functional modules as follows.

USD.AMS 151 which communicates with the PC via the connector 11 and therefore establishes a communication with the PC so that data can be sent by the COMMS.ASM unit 152 and also enable setting of flags when commands are received. The COMMS.ASM unit 152 transmits and receives packets of data between stacked devices 10. This unit handles commands received from the USB unit 151 and sends status packets received from other storage devices 10 in the stack array and also sets flags to control the UART.ASM unit 153. The UART.AMS unit 153 couples with the connectors 28 and 30 for supplying data to other storage units 10 which may contain the CD ROM which is required to be accessed.

The COMMS.AMS unit 152 is connected to CTRL.AMS unit 154 which controls movement of the carousel and determines the current position of the carousel from data received from the 128.AMS unit 155. The unit 154 powers a motor 32. The unit 155 provides information from the photo interrupter sensor 118 to 122 and 140/141 to provide data relating to the position of the carousel and also whether a CD has been successfully ejected through the opening 14.

FIG. 12 shows a number of the units 10 stacked one above the other in this embodiment two arrays A1 and A2 are provided. Each of the arrays comprises four units 10 which interconnect together via the connectors 28 and 30 as previously described. Each array A1 and A2 is connected to a USB hub 160 which in turn connects to PC 200. If only array A1 is used the array can be directly connected to the PC 200 without the need for the hub 160. The PC 200 or the hub 160 is connected into the bottom device 10 of each arrow A1 and A2. However, the PC 200 or hub 160 could be connected into any one of the devices 10 in the arrays A1 and A2.

If arrays A1 and A2 are used the operating system, when it is desired to access a particular CD, will determine which of the arrays A1 has the storage device 10 which houses the CD and which of the devices 10 actually houses the CD. Data from the PC 200 will be forwarded to all of the devices 10 however the controller in each of the devices will determine whether the information and ejection relates to a storage compartment in that device. The device in which the CD is stored can be controlled by its controller on circuit board 46 to cause the lever 96 to be operated by the solenoid 92 in that device 10 to eject the CD after the carousel 40 has been rotated to present the required compartment at the outlet opening 14 so that the appropriate device 10 is accessed and the correct CD is ejected by the lever 96. Communication protocol under the control of the PC 200 and the circuit boards 46 will pass data through all of the devices 10 in the stack. This will allow all of the devices 10 to know what other devices are doing at any one time thus allowing the USB hub 160 or port from the PC 200 to be connected to any one of the devices 10 in the arrays of stacks.

Figure 13:
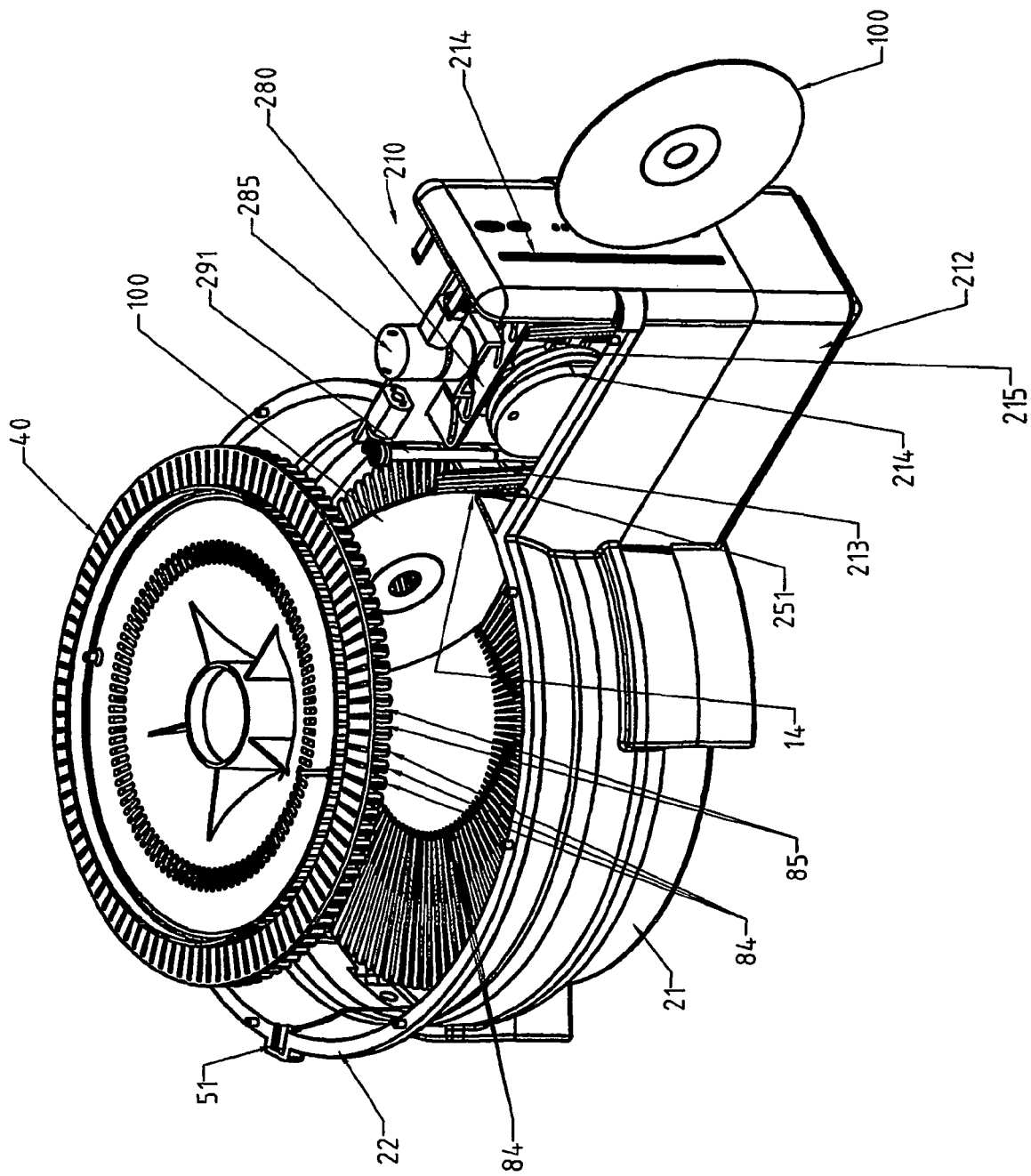
FIG. 13 is a perspective view of a second embodiment of the invention.
Figure 14:
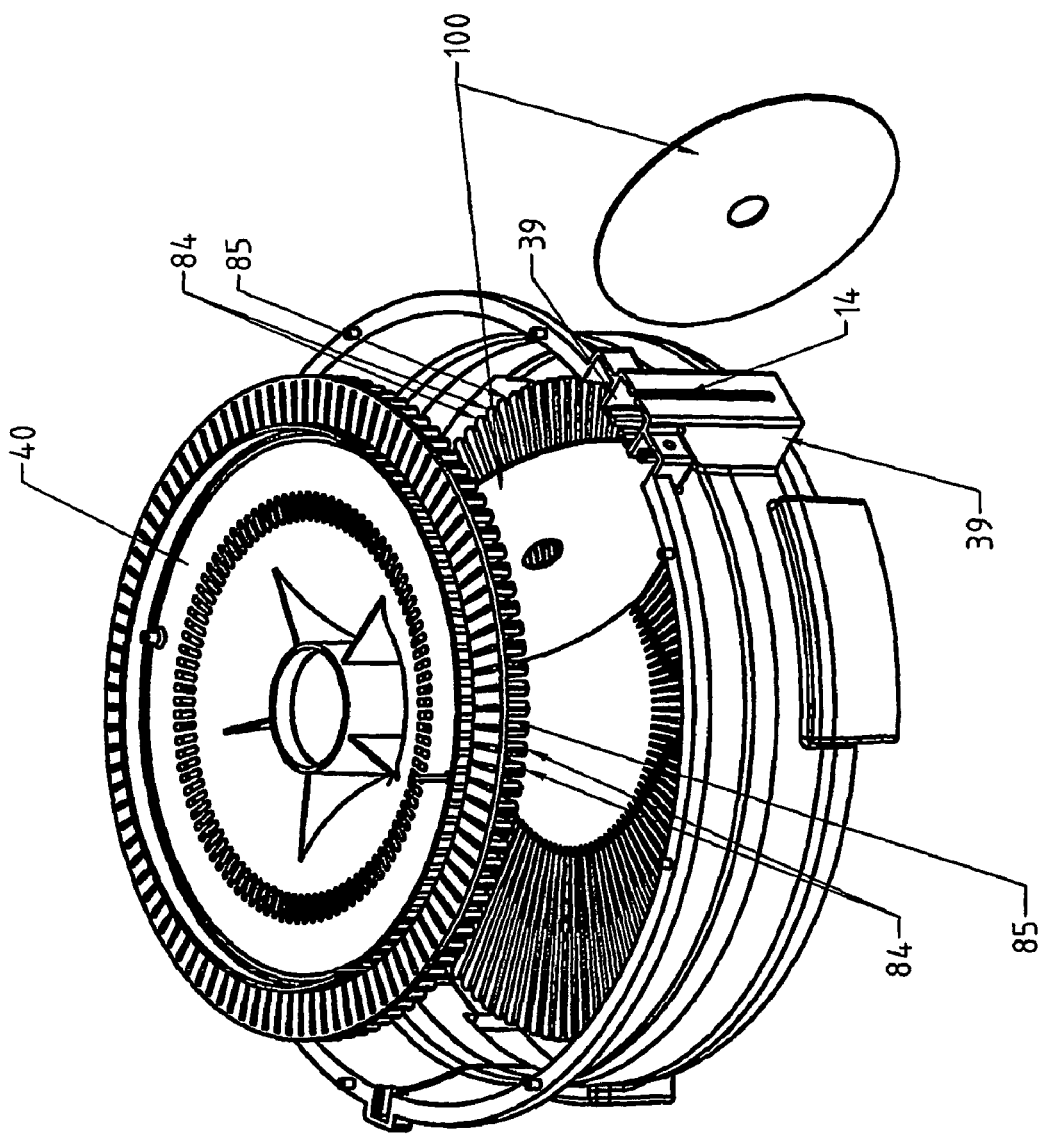
FIG. 14 is a view of the embodiment of FIG. 13 with some of the componentary removed for ease of illustration and explanation.

FIGS. 13 and 14 show a second embodiment of the invention which incorporates its own reader which can read or write onto a CD ROM and therefore enable the CD ROM to be accessed without the user having to remove the CD ROM from the device 10 and place it into the CD reader of a computer.

Like parts to those described in the earlier embodiment are indicated by like reference numerals. The operation of the device in FIG. 13 insofar as it relates to the storage of a CD 100 and ejection of a CD 100 through the opening 14 is exactly the same as that described in the earlier embodiment.

In this embodiment a reader 210 is formed integral with the casing section 22 or attached to the casing section 22 by suitable fasteners such as screws or bolts (not shown). The reader 210 has an outer housing 212. The housing 212 has a first entry opening 213 which may simply comprise an open end of the reader 210 which connects to the peripheral wall of the device 10 covering the opening 14. A second access opening 214 is linearly arranged with respect to the opening 213 and opening 14.

Thus, a CD 100 (for example that marked 100') can be inserted through the opening 214, read in the reader 210 and then passed through the opening 213 and opening 14 into one of the storage compartments 85 as shown by the CD 100 in FIG. 13. The CD reader 210 is connected to the circuit board 46 within the device 10 so the reader 210 can be controlled by the circuit board 10 and also data can be transmitted to and from the CD reader 10 for application to the personal computer 200.

FIGS. 15 to 19 show the CD reader 212 and further reference will now be made to those Figures.

With reference to FIGS. 15 to 19 the CD reader 210 includes a floor 221. A support 216 extends upwardly from the floor 212 and carries stationery support disc 215 which carries a floating metal disc 215a in the manner which is well known. A reader/writer unit 241 is pivotally coupled on a pivot pin 242 which is connected to a bottom portion of a frame 243 which locates in a bracket 244. The frame 243 can pivot in the direction of double headed arrow F in FIG. 15 from the position shown and marked with the reference 243 in FIG. 16 to the position shown by reference 243'. The frame 243 carries a reading head or a read/write head in a manner which is known and therefore will not be described in detail herein. A read or read/write head manufactured by Phillips NV is used in the preferred embodiment and the frame 243 in which the head is located is made by Acer. The frame 243 carries a motor 245 which drives a support disc 246 which will engage a CD so as to spin the CD so that CD can be read by the read head or written onto by the read/write head. A rear frame plate 249 is connected to the floor 221 and carries a pair of frame arms 250 (only partially shown in FIG. 18 for ease of illustration).

Plates 252 are connected on either side of the frame 243 and support a cross-frame member 245. The cross frame member 245 has a pair of upstanding clamp rails 251. Upper portions of the clamp rails 251 can be connected by a further cross bar (not shown). Optical sensors 259 and 260 are located on the clamp rails 251 or on the cross bar (not shown) between the guide rails 251 for detecting movement of CD 100 into the reader 210. The sensors 259 and 250 may be photo interrupters of the type previously described and will determine when the CD 100 correctly sits in the frame 243 so that it registers with the disc 246. A further photo interrupter schematically illustrated by reference 262 is provided for detecting movement of the CD 100 into the reader 210 from the storage unit 10, and a still further photo interrupter schematically illustrated by reference 263 is provided for detecting movement of the CD through the opening 214 of the reader 210.

A plate 270 (best shown in FIG. 20) is supported above the frame 243 and has a cutout 271 which has a inner edge 272. The inner edge 272 carries a rack 273. The plate 270 also has two S-shaped slots 274 which are parallel with respect to one another and arranged at the opposite ends of the plate 270. The frame 243 is connected to the plate 270 by pins 280 which engage with the slots 274. A motor 285 is mounted on rear wall 249 and has an output shaft 286 which carries a gear 287. The gear 287 engages the rack 273 on the plate 270 so that when the motor 285 is operated the gear 287 rotates to drive the rack in the direction of double headed arrow G in FIGS. 15 and 20. To support movement of the plate 270 in the direction of arrow G the plate 270 is mounted onto a beam 288 (see FIG. 19) which locates in brackets 289 on the rear of the wall 249. The wall 249 has a slot through which the plate 270 projects so that it can engage with the beam 288. Thus, the beam 288 can slide in the brackets 289 so that the plate 270 is supported for linear movement in the direction of arrow G.

Figure 20:
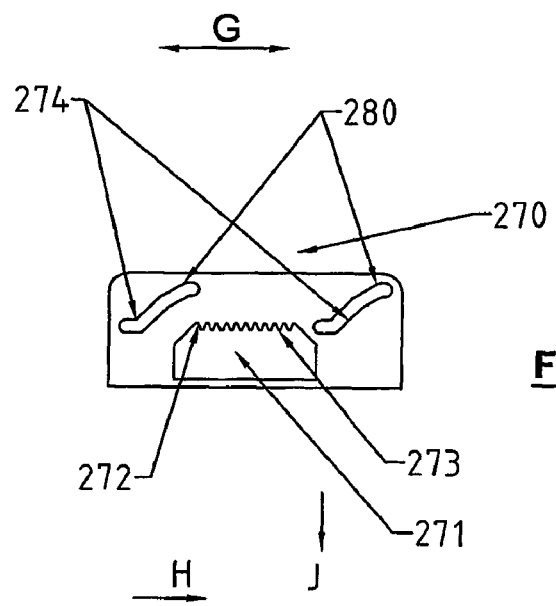
FIG. 20 is a perspective view of part of the reader of FIG. 13.
Figure 19:
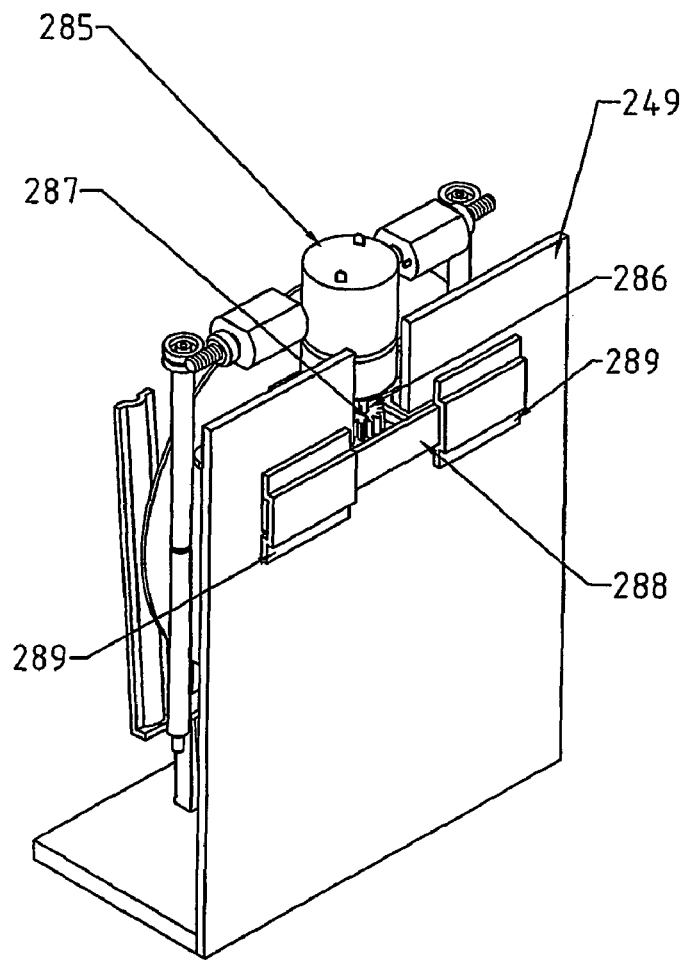
FIG. 19 is a perspective view from the other side of the reader shown in FIG. 18.

When the plate 270 is moved in the direction of arrow H (FIGS. 15 and 20) the pins 280 which are connected to the frame 243 ride in the slots 274 from the position shown in FIG. 20 towards the other end of the slots 274. This causes the pins to move in the direction of arrow J in FIG. 20 so the frame 243 is caused to pivot about pivot pin 242 so that the plate 243 together with the read/write head and motor 245 and disc 246 also move with the frame 243 from the position shown by reference 243 in FIG. 16 to the position shown by reference 243'. In this position the frame 243 is moved towards the clamp posts 251 so that a CD is securely clamped between the disc 246 and the clamp posts 251.

Figure 16:
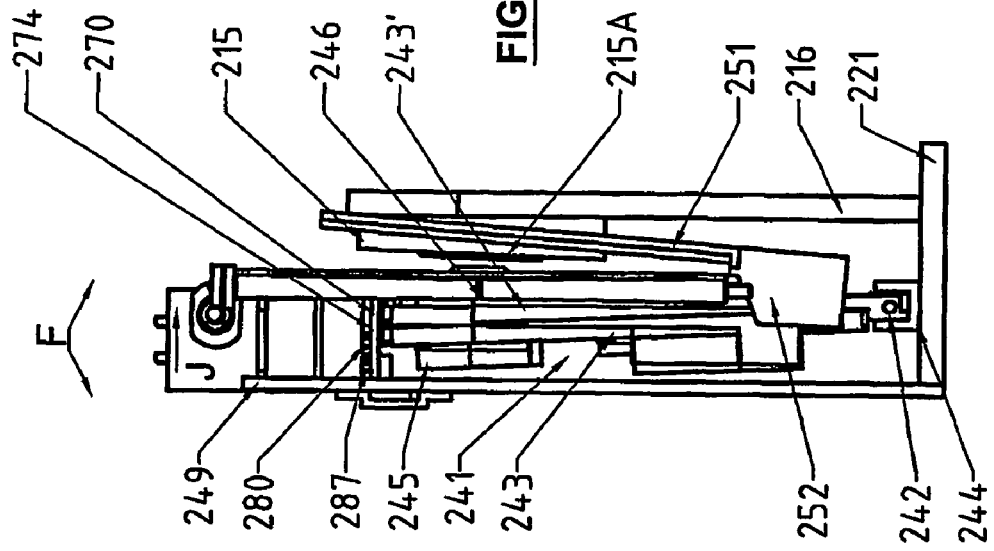
FIG. 16 is a end view of the reader of FIG. 15.
Figure 15:
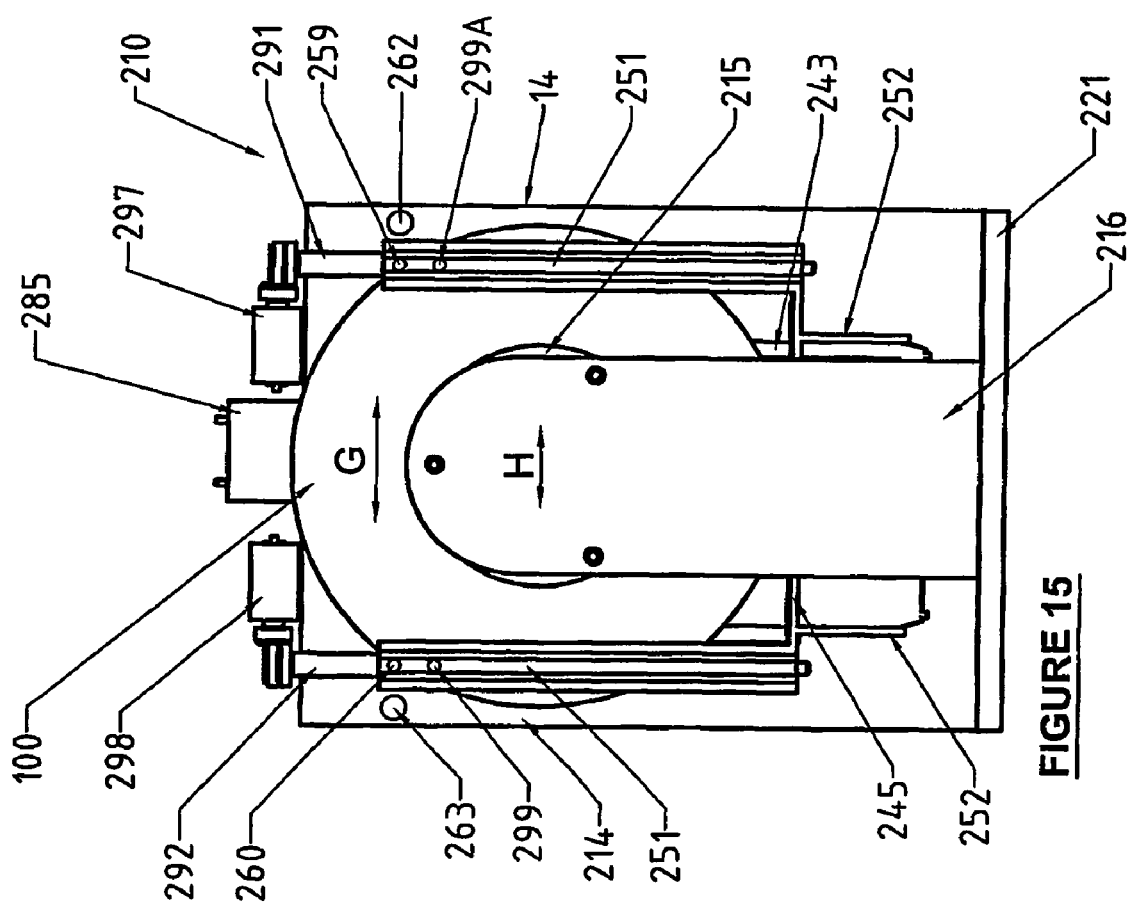
FIG. 15 is a side view of a reader used in the second embodiment of the invention.
Figure 17:
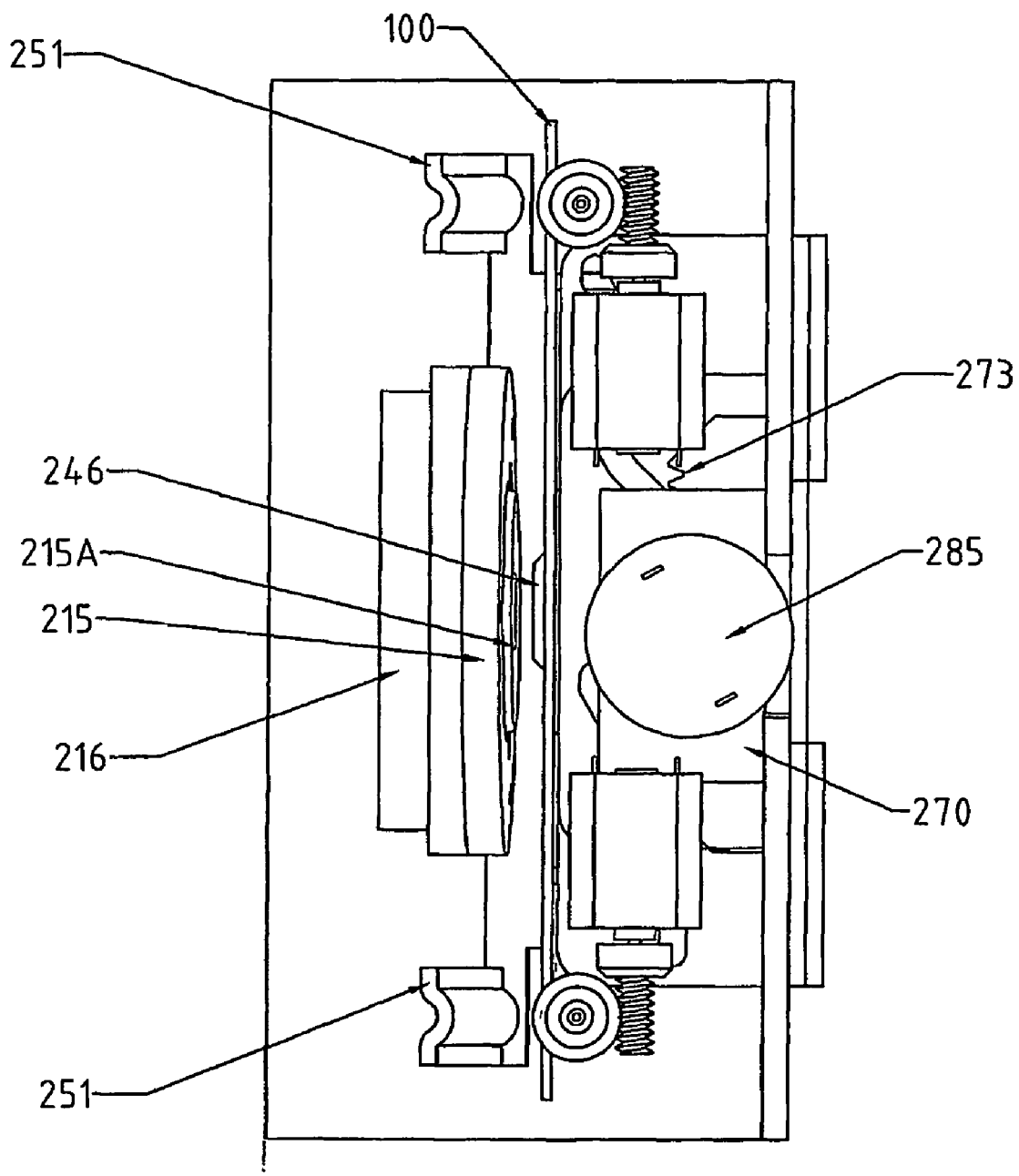
FIG. 17 is a plan view of the reader of FIGS. 15 and 16.
Figure 18:
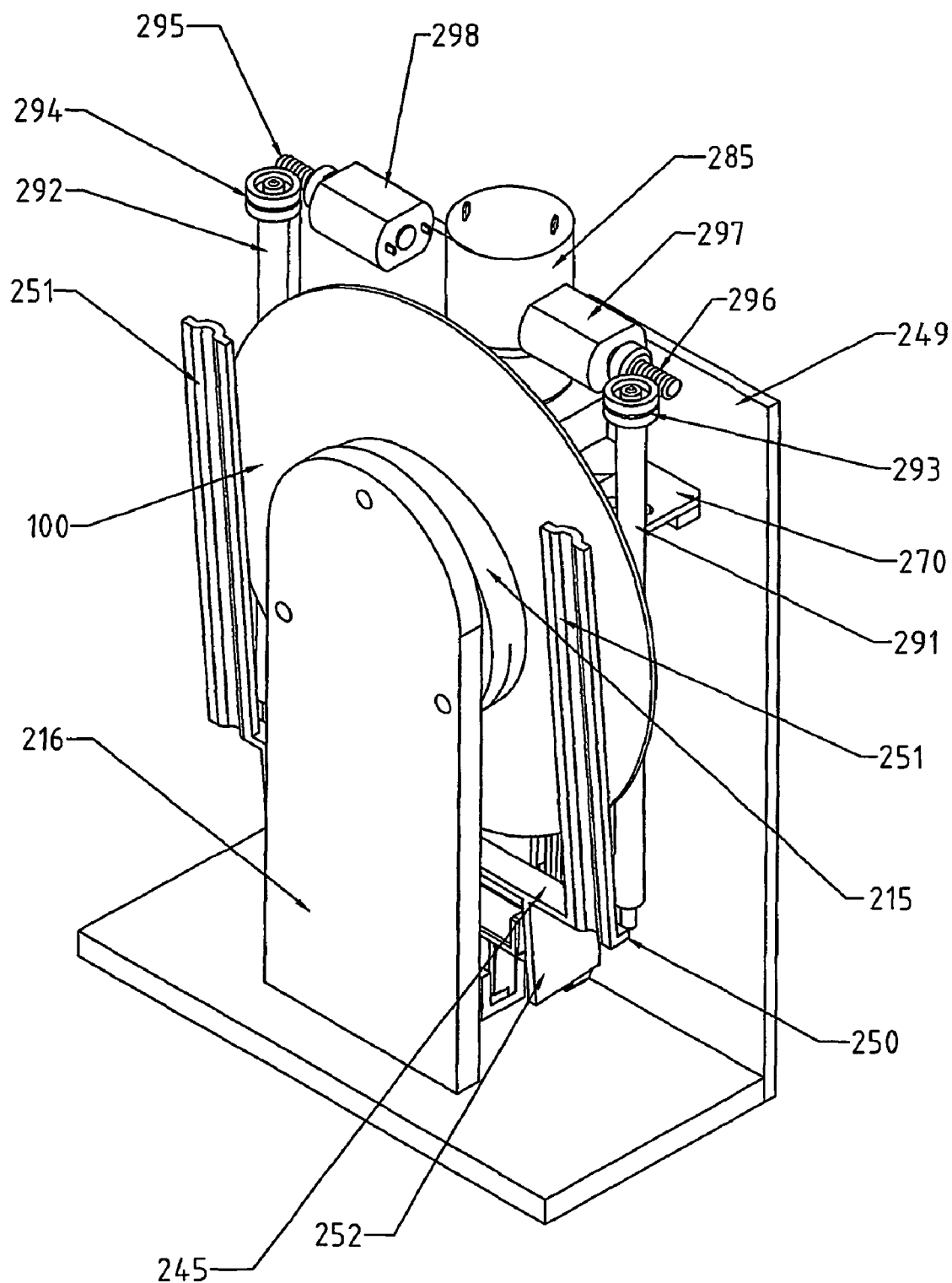
FIG. 18 is a perspective of the reader of FIG. 15 with some componentary removed for ease of illustration and explanation.

When the motor 285 is rotated in the opposite direction the plate 270 is driven in the direction opposite arrow H so that the pins 280 ride in the slots 274 back to the position shown in FIG. 20 to pivot the plate 243 from the position marked 243' in FIG. 16 back the position 243 to effectively release the CD 100.

The above described structure which supports the frame 243 for pivotal movement and causes pivoting movement of the frame 243 is conventional and therefore no further description needs be given.

The reader 210 has a first roller 291 and a second roller 292 which are supported between bottom arms 250 fixed to the rear wall 249 and similar arms (not shown fixed at the tope of the plate 249). The rollers 291 carry gears 293 and 294 which mesh with worm drives 295 and 296 provided on the output shaft of motors 297 and 298. The motors 297 and 298 are fixed onto the rear wall 249.

When the reader 210 is in the standby position waiting for a CD 100 the frame 243 in the position 243 shown in FIG. 16. In this position the clamp arms 251 which are fixed with the frame 243 by the plates 252 and the cross frame member 245, are moved away from the rollers 291 and 292 so that a space exists between rollers 291 and 292 and the clamp bars 251 which is generally in alignment with the openings 14, 213 and 214.

When the CD 100 is inserted through opening 214 of the reader 210 the photo interrupter 263 detects the entry of the CD and causes the motor 285 to operate so that frame 243 is pivoted into the position 243 in FIG. 16. This moves the clamp posts 251 towards the rollers 291, 292 to clamp the CD between the clamp post 251 and the rollers 291 and 292. Micro-switches 299 and 299a are located on the clamp posts 251 and when the clamp post are in the fully closed position at which they clamp the CD 100 between the posts 251 and the rollers 291, 292 the micro-switch is activated to provide a signal to the control electronics on the board 46 to show that the CD is clamped between the post 251 and the rollers 291 and 292. The motors 297 and 298 can then be driven to rotate the rollers 291 and 292 so that the CD which has been manually inserted into opening 214 is drawn into the CD reader so that the CD registers with the support disc 246 coupled to the motor 245. The photo interrupters 259 and 260 detect the periphery of the CD 100 to determine that the CD 100 is correctly located within the reader in the position in FIG. 15. In this position the CD 100 is correctly located so that it can engage on the support disc 246. The rollers 291 and 292 can be rotated in either direction about their longitudinal axis so that the CD 100 can be moved back and forward in the direction of double headed arrow G so as to locate properly in the reader is necessary. When the photo interrupters 259 and 260 register that the CD is correctly located the motor 285 is activated to move the plate 270 in the direction opposite arrow H. This causes the pins to again move in the slots 274 which will cause the frame 243 to pivot from the position marked 243 in FIG. 16 to the position marked 243'. Movement of the plate 243 will also move the clamp posts 251 so that they are moved away from the rollers 290 and 291. This movement of the frame 243 will also push the support disc 243 towards the floating disc 215a contained in the stationery disc 215. The disc 215a is attracted to the disc 246 by magnetic attraction (as is conventional), so that the CD is securely clamped onto the support disc 246 between the support disc 246 and the floating disc 215a which floats within the disc 215 (as is conventional). It should be understood that in this position the CD 100 is not clamped between the rollers 291, 292, and the support post 251 because the support posts 251 have been moved away from the rollers 290, 291 with pivotal movement of the frame 243 to the position 243'.

After the plate 270 has been moved the motor 245 can be operated to spin the CD so that the CD can be read by the reader supported in the frame 243 or written onto by the write head supported in the frame 243.

If it is desired to completely eject the CD 100 from the storage device 10 then the rollers 292 are rotated in the opposite direction by the motors 297 and 298 so that the CD is moved in the opposite direction and out through the opening 214 of the reader.

Thus, by appropriate control of the motors 297 and 298 the rollers 291, 292 can rotated in either direction to move a CD 100 as follows;

(a) from a storage compartment 85 into the CD reader for reading or writing, then back into the storage compartment 85, or alternatively out the opening 214; or
(b) from the opening 214 into the reader 210 for reading or writing and then through the opening 213 and opening 214 for storage in the carousel 40.

Thus, the CD is able to move linearly completely through the reader 210 from the opening 214 to the opening 213 so the CD can be stored, read or ejected from the device 10 as is required.

When the CD 100 is to be initially loaded into the device for storage, the reader 210 need not read the CD and the rollers 290, 291 can be activated so that the CD is driven from the opening 214 straight through the reader 210 and out of the opening 213 and through opening 14 into a storage compartment 85 within the carousel 40. However, during initial storage it may be advantageous for the CD to be stopped in the reader 210 so that it is read so that an icon relating to a program on the CD can be stored in the computer and displayed so that when it is desired to select the CD from the storage compartment 85 it is only necessary for the operator to click on the CD and the CD can then be located in the reader 210 when it is required to be used.

When it is required to store the CD 100 in one of the compartments 85 the carousel 40 is rotated in the manner described previously so as to bring the appropriate compartment 85 into alignment with the opening 214 of the reader 210 which is in alignment with the opening 14. The motor 285 is again activated so as to move the plate 270 so that the CD 100 is again clamped between the clamp post 251 and the rollers 291 and 292. The motors 297 and 298 are activated to rotate the worm drives 295 and 296 in the appropriate direction to, in turn, rotate the gears 293 and 294 and therefore the rollers 291 and 292 in the appropriate direction to drive the CD 100 out of the opening 214 and through opening 213 into the storage compartment 85.

Figure 21:
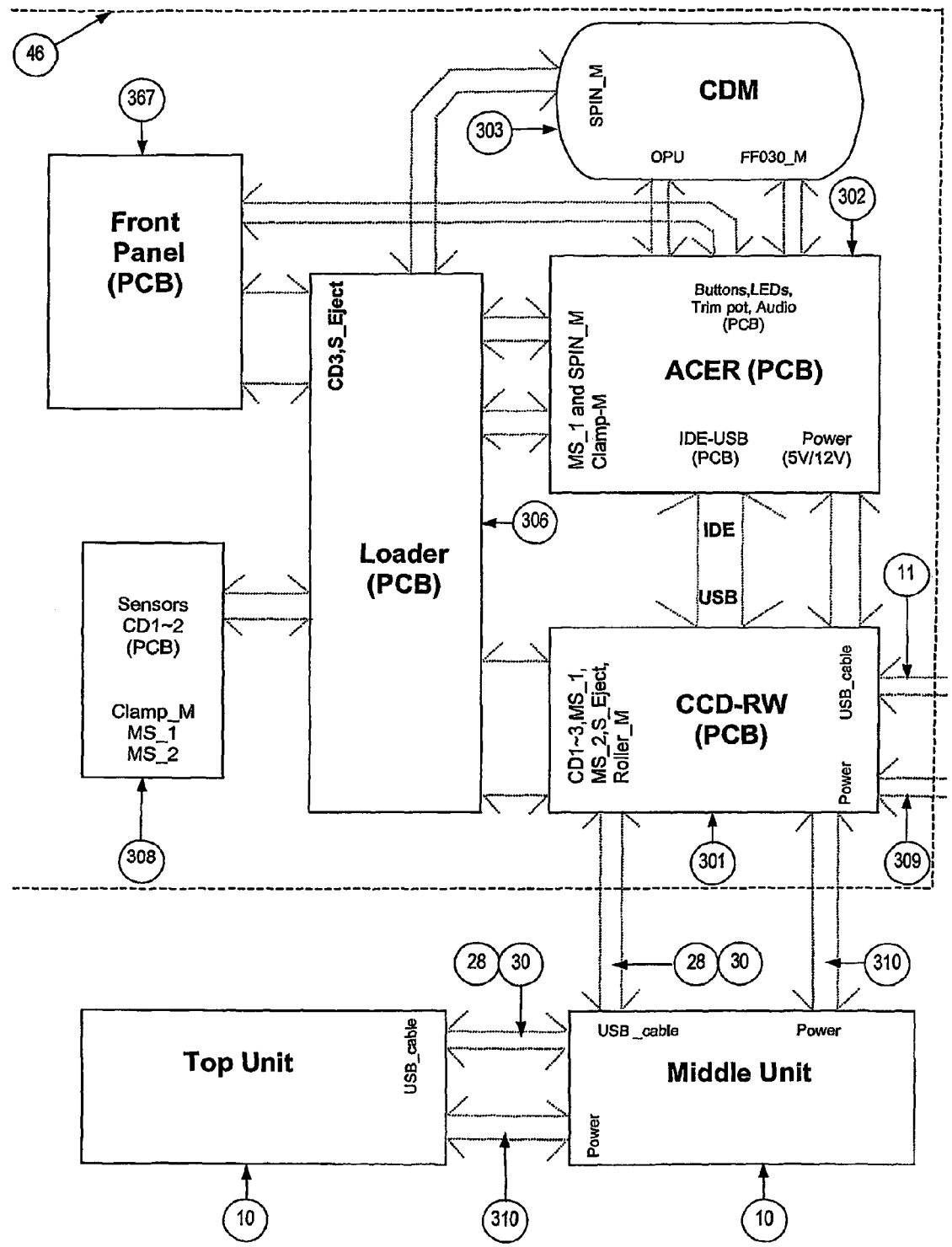
FIG. 21 is a circuit block diagram.
Figure 22:
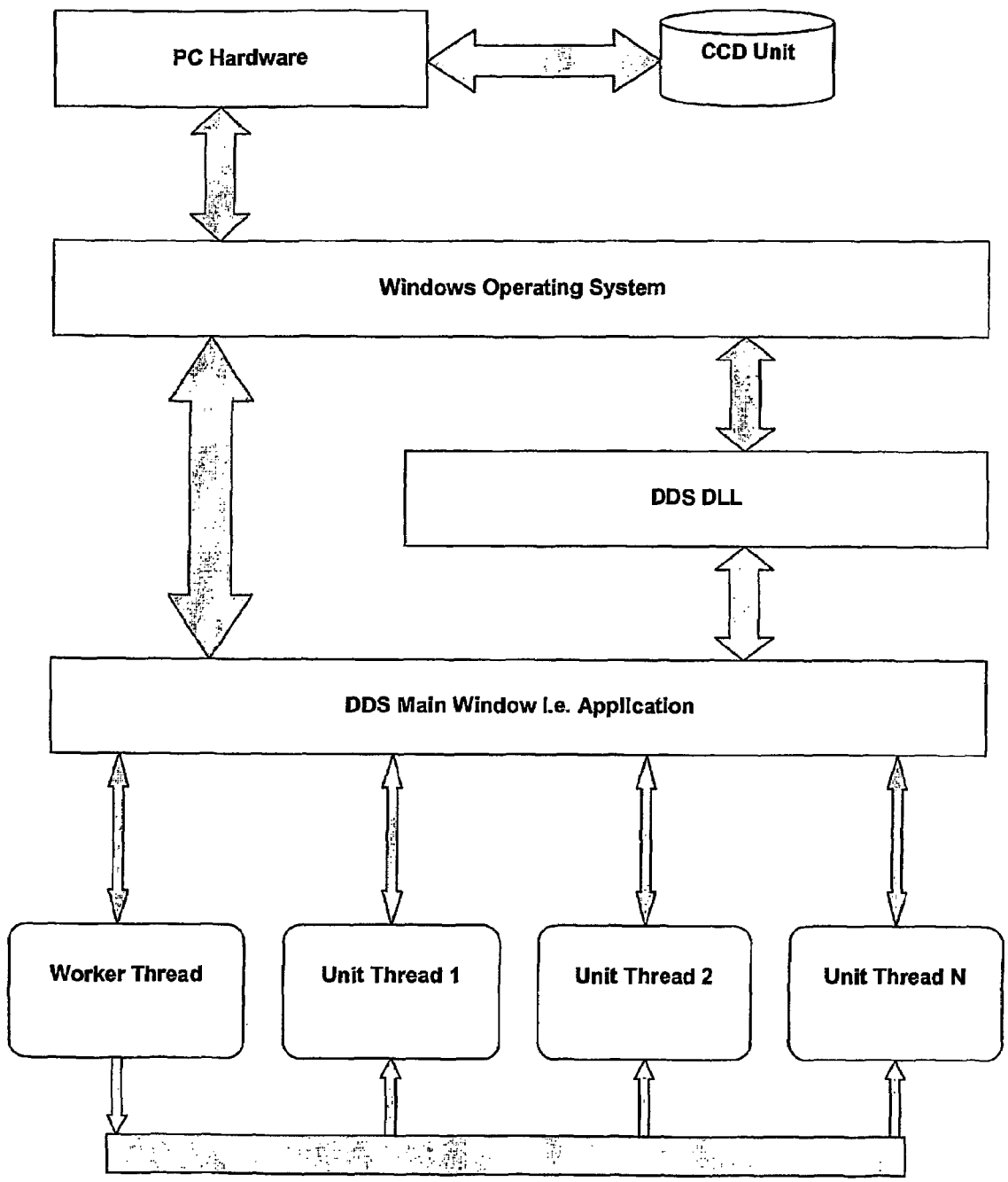
FIG. 22 is a diagram illustrating the software architecture according to the embodiment of FIG. 13.
Figure 23:
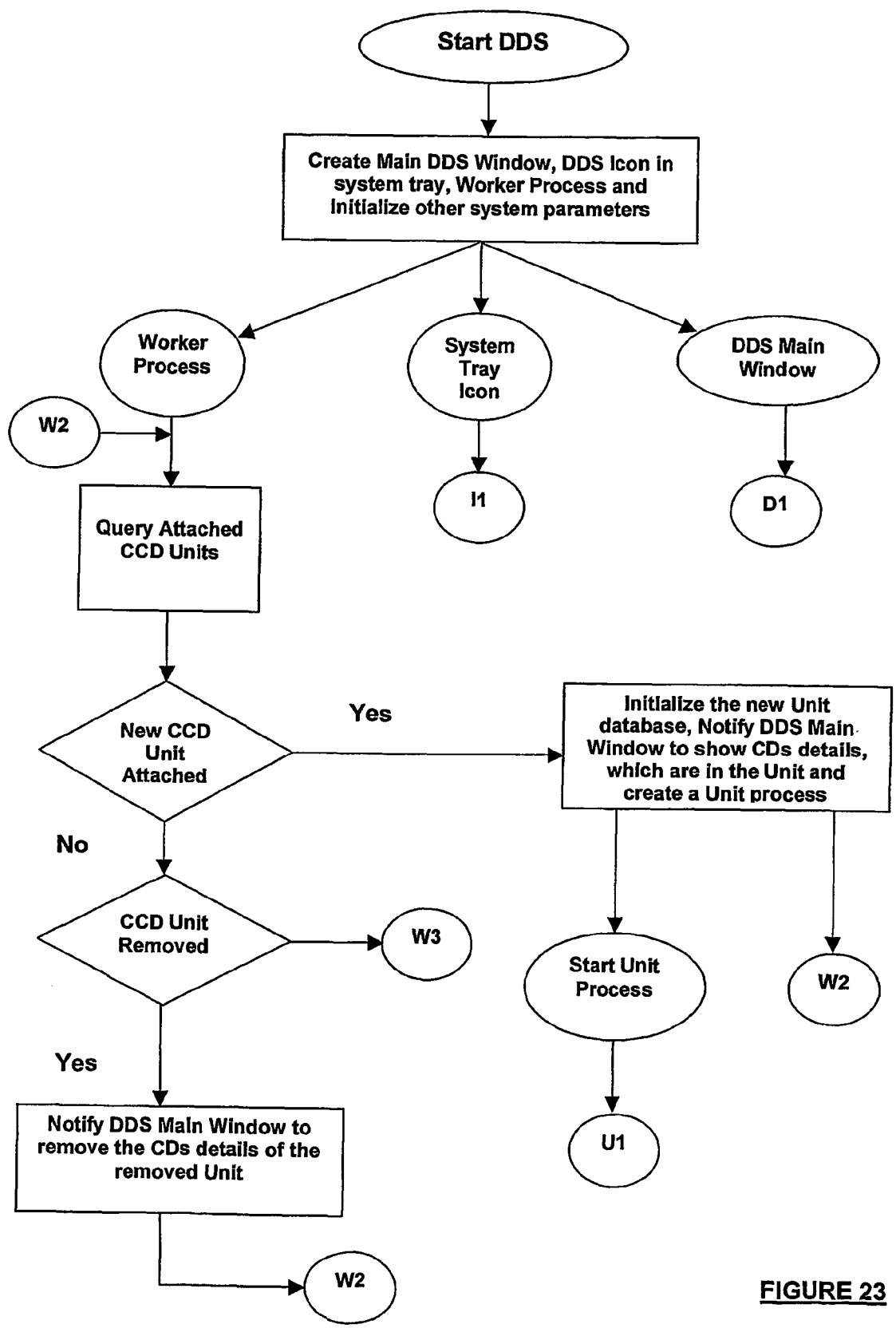
FIG. 23, FIG. 24, FIG. 25, FIG. 26 and FIG. 27 show a flow chart illustrating operation of the embodiment of FIG. 13.
Figure 24:
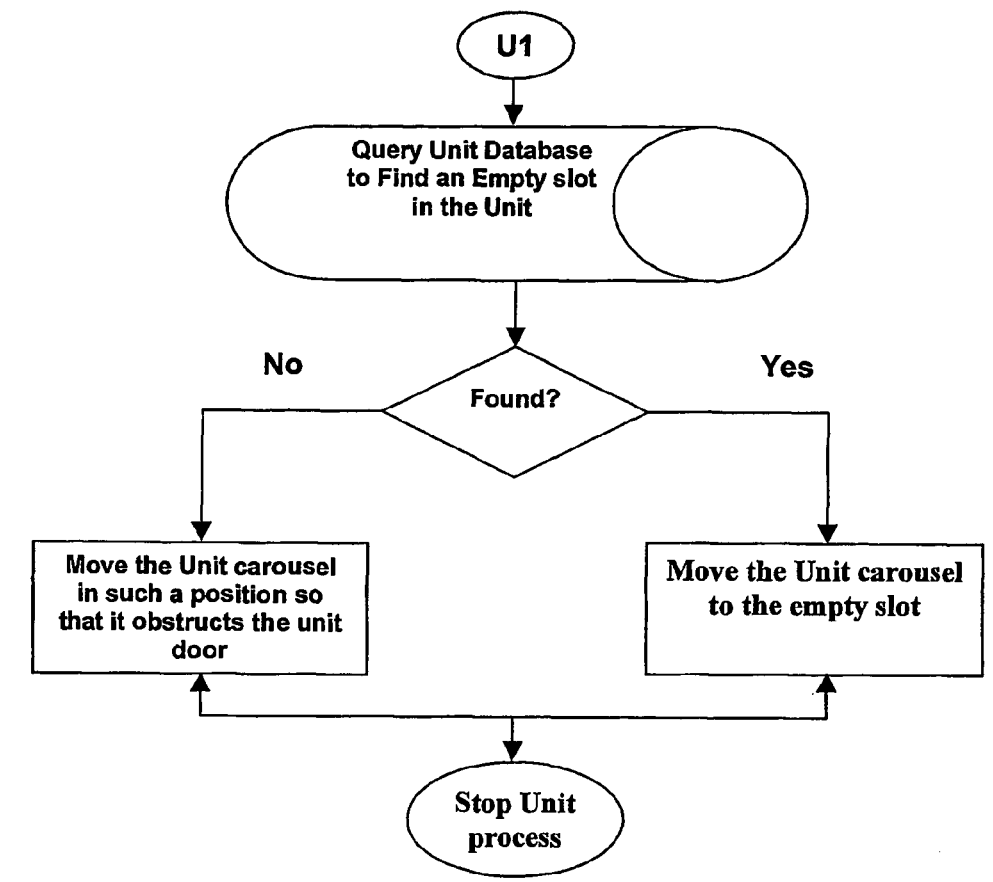
Figure 24:
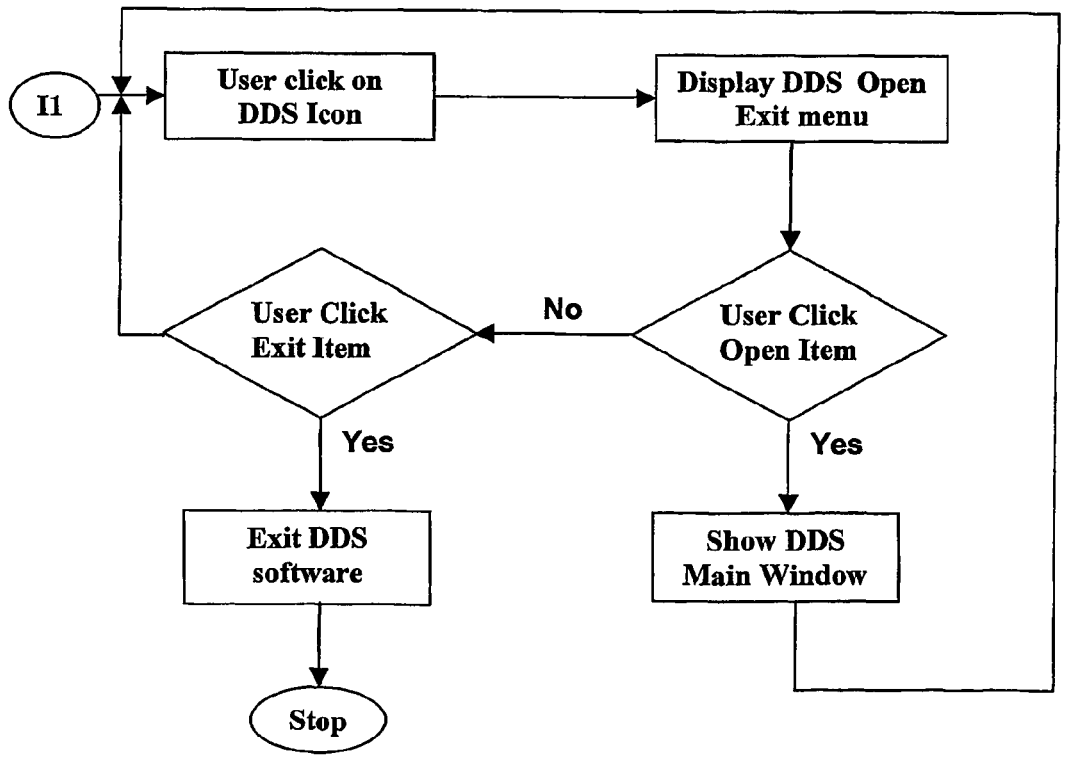
Figure 25:
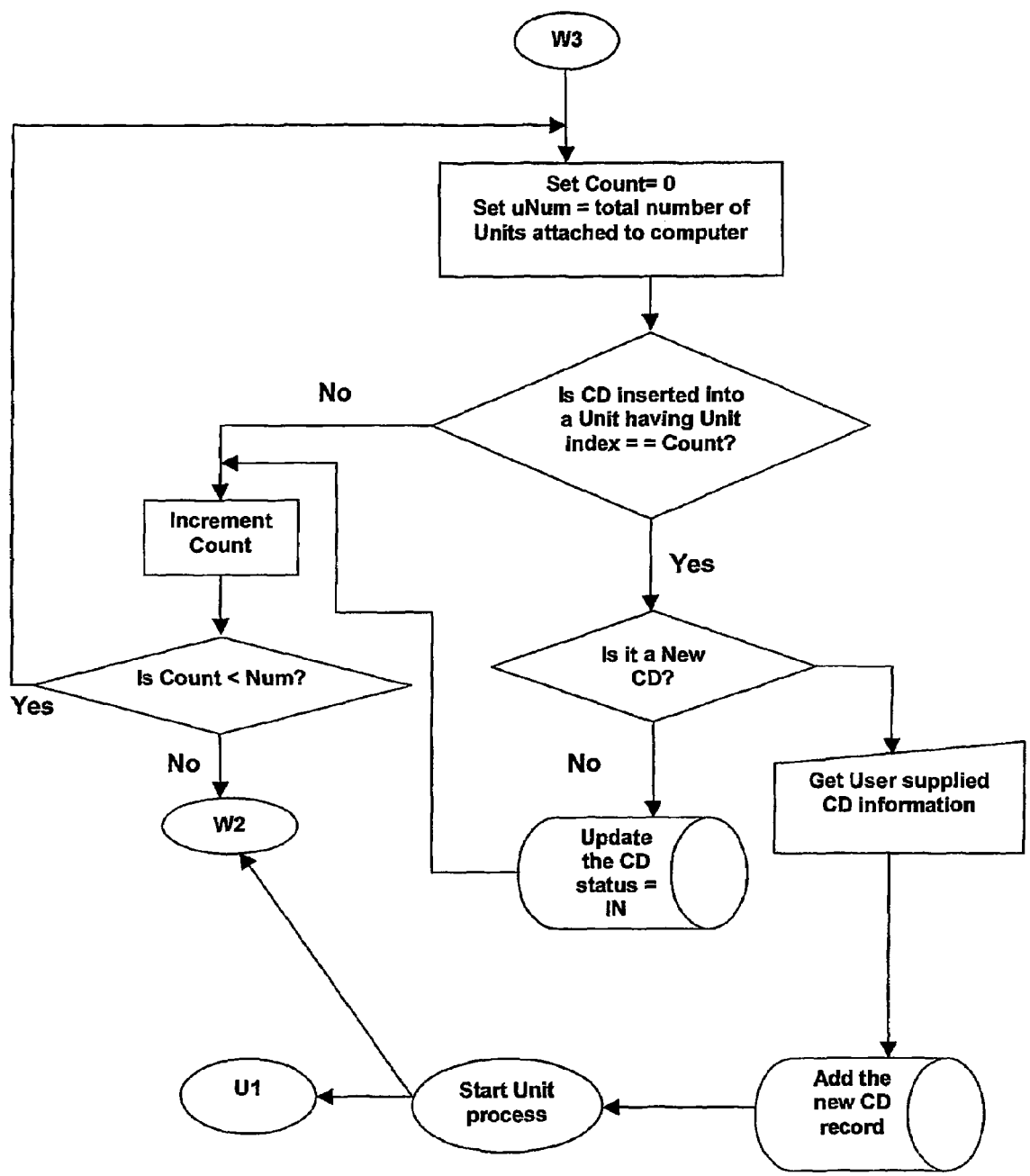
Figure 26:
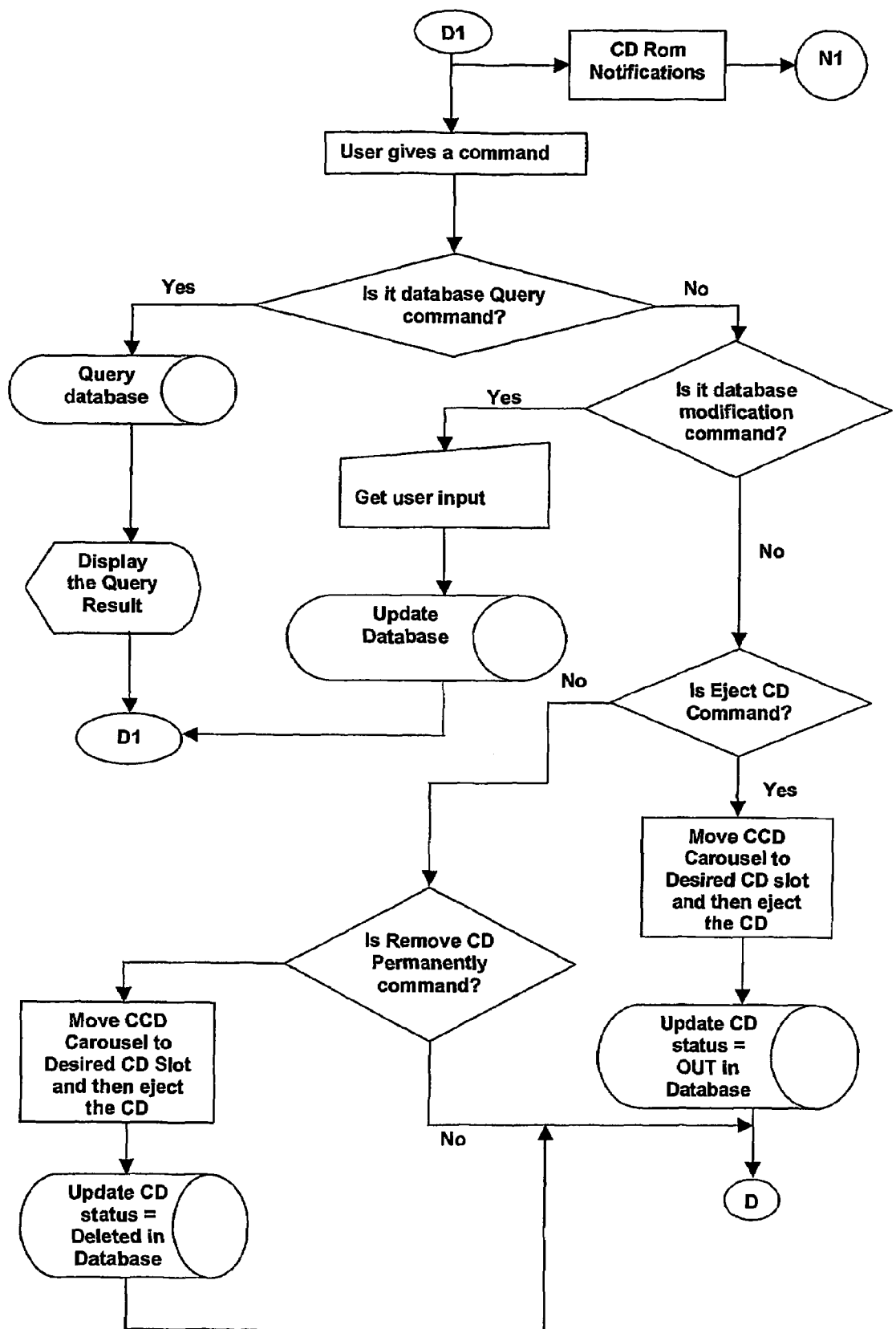
Figure 27:
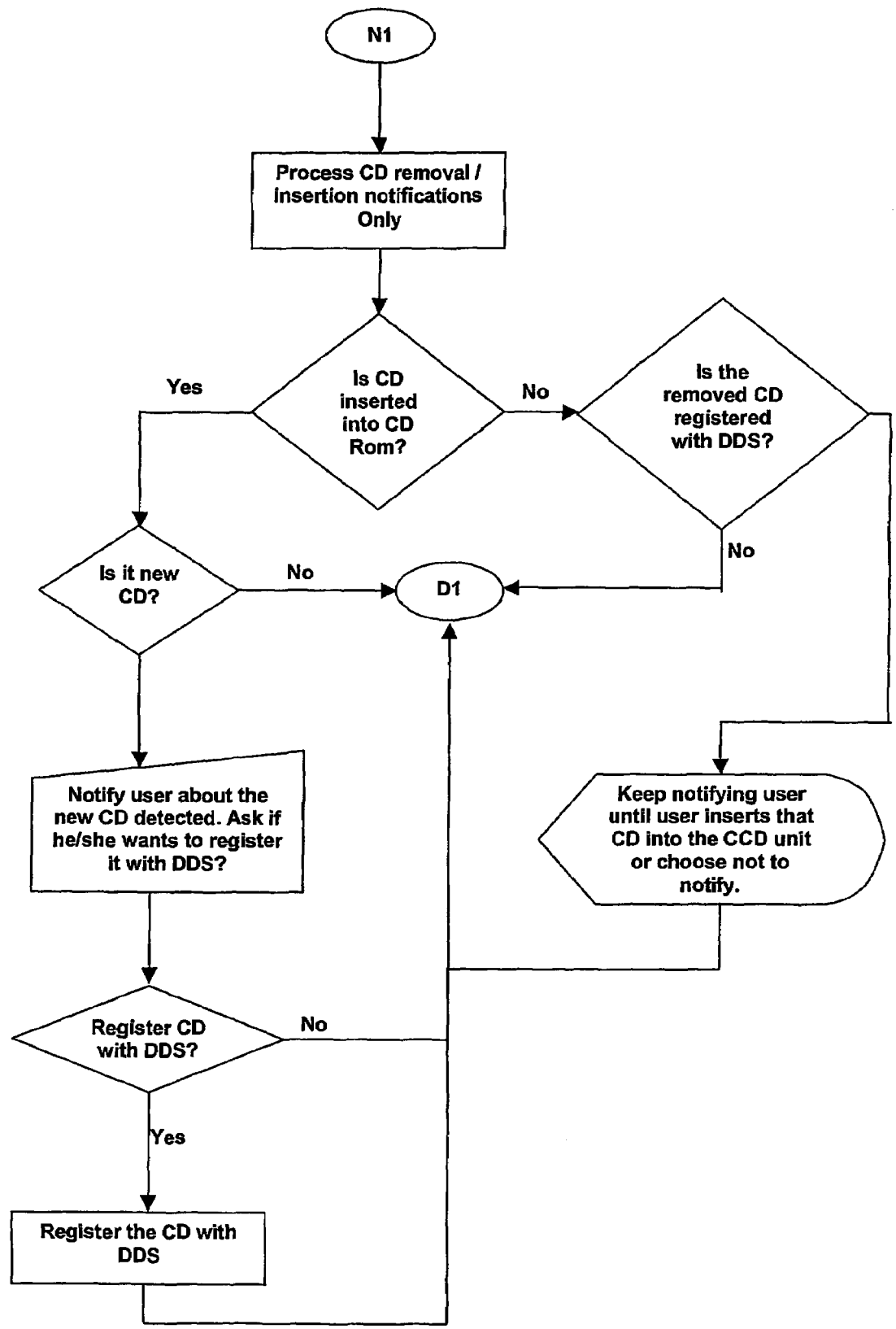

FIG. 21 shows a schematic diagram of the controller for the embodiment FIG. 13. FIGS. 22 to 27 show the basic software architecture of the embodiment of Figure.

Printer board 46 in this embodiment includes a main board section 301 which contains all the software and operating functions for operating movement of the CDs into and out of storage and into the reader. The main circuit board 301 is connected to an Acer board 302 which controls the read/write functions of the reader 210. The board 302 is connected to a CDM board 303 which controls the physical movement of the read/write head and controls the motor for spinning the CD within the reader 210.

The board 301, 302 and 303 are connected through a loader board 306 to a front panel board 307 and to a sensor board 308. The loader board 306 effectively forms a connector between the remaining boards and can be used to combine some signals such as an eject signal which may be produced by manual operation of the eject button on the reader 210 or an eject signal under the control of the PC 200, so that the signals can be supplied to the appropriate mechanics to cause ejection of CD.

The board 308 controls the sensor 259 and 260 for detecting the correct position of the CD 100 in the reader so that the CD can be spun so the CD can be read or written onto. This port also can control micro-switches schematically shown by references 299 and 290a which can be used to show that the rollers 291 and 292 and the clamping rails 251 are in the clamping position.

Front board panel 306 controls the operation of various buttons and lights which may be on the front panel of the reader 210 which shows that the reader is in operation and also includes eject buttons and the like for enabling a CD to be ejected from the reader 210 if required.

Power may also be connected through a power cable 309. The board 46 in one of the devices 10 can be connected to another device 10 by the inter connection of the connectors 28 and 30 and also a power connector 310 (which may be part of or along side the connectors 28/30. The middle unit may be connected to a top unit 10 once again by connectors 28/30 and suitable power connector 310.

Figure 28:
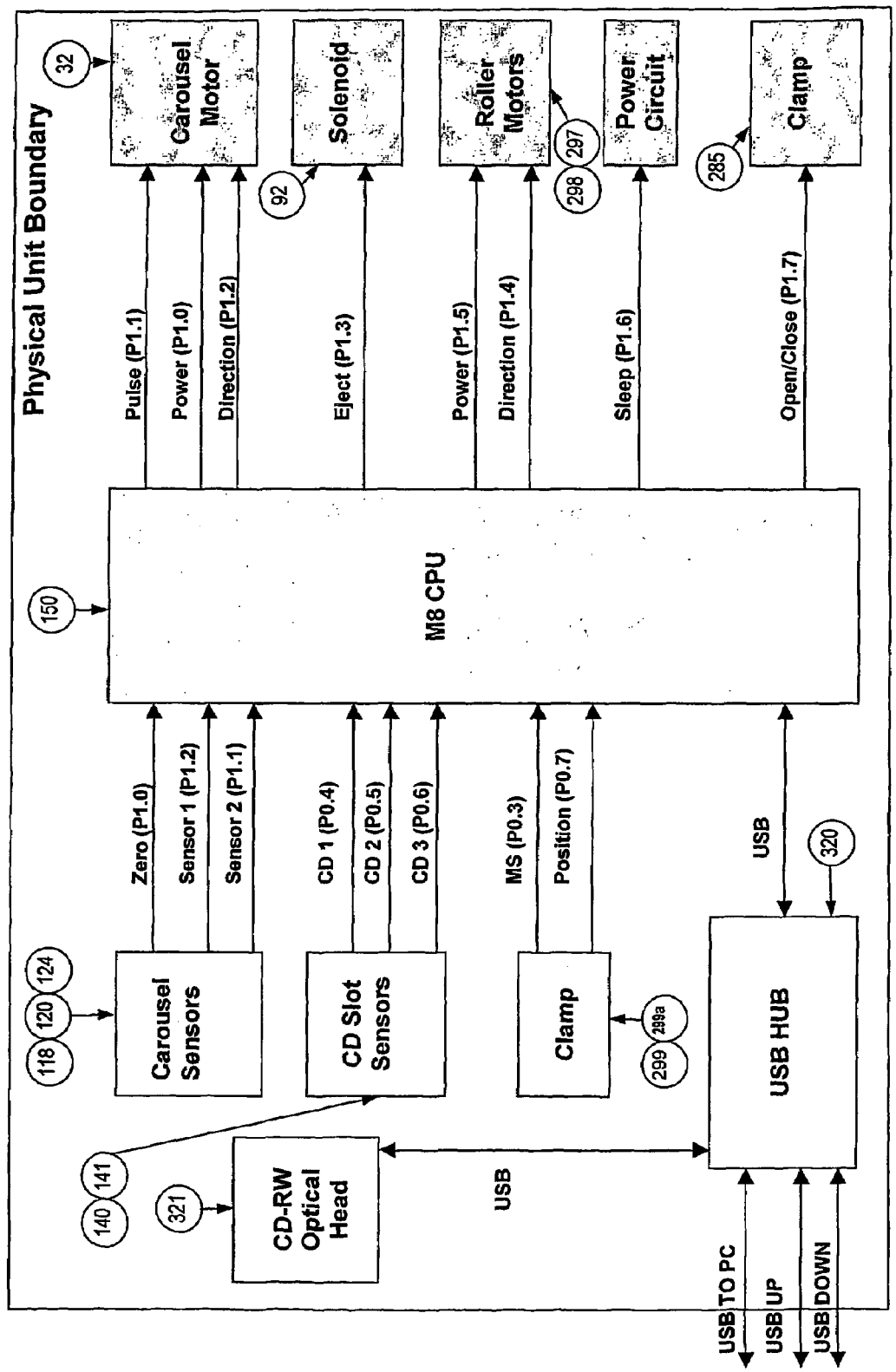
FIG. 28 is a circuit block diagram illustrating the controller of the embodiment of FIG. 13.

FIG. 28 shows the setup of the main board 301 in FIG. 21 and similar reference indicate like parts to those described with reference to FIG. 10.

In this embodiment of the invention the processor 150 is also connected to the roller motors 297/298 and motor 285 for opening and closing the clamp formed by the clamp rails 251 and the rollers 291 and 292.

The processor 150 also connects to the micro-switches 299 and 299a.

The processor 150 also connects to the USB hub 320 which in turn is also connected to the optical head 321 which is included in the read/write head which is mounted in the frame 243. The hub 320 has the connections for connecting direct to PC 160 and also to a further unit 10 stacked above or below that shown in FIG. 28 via the connectors 28/30.

Figure 29:
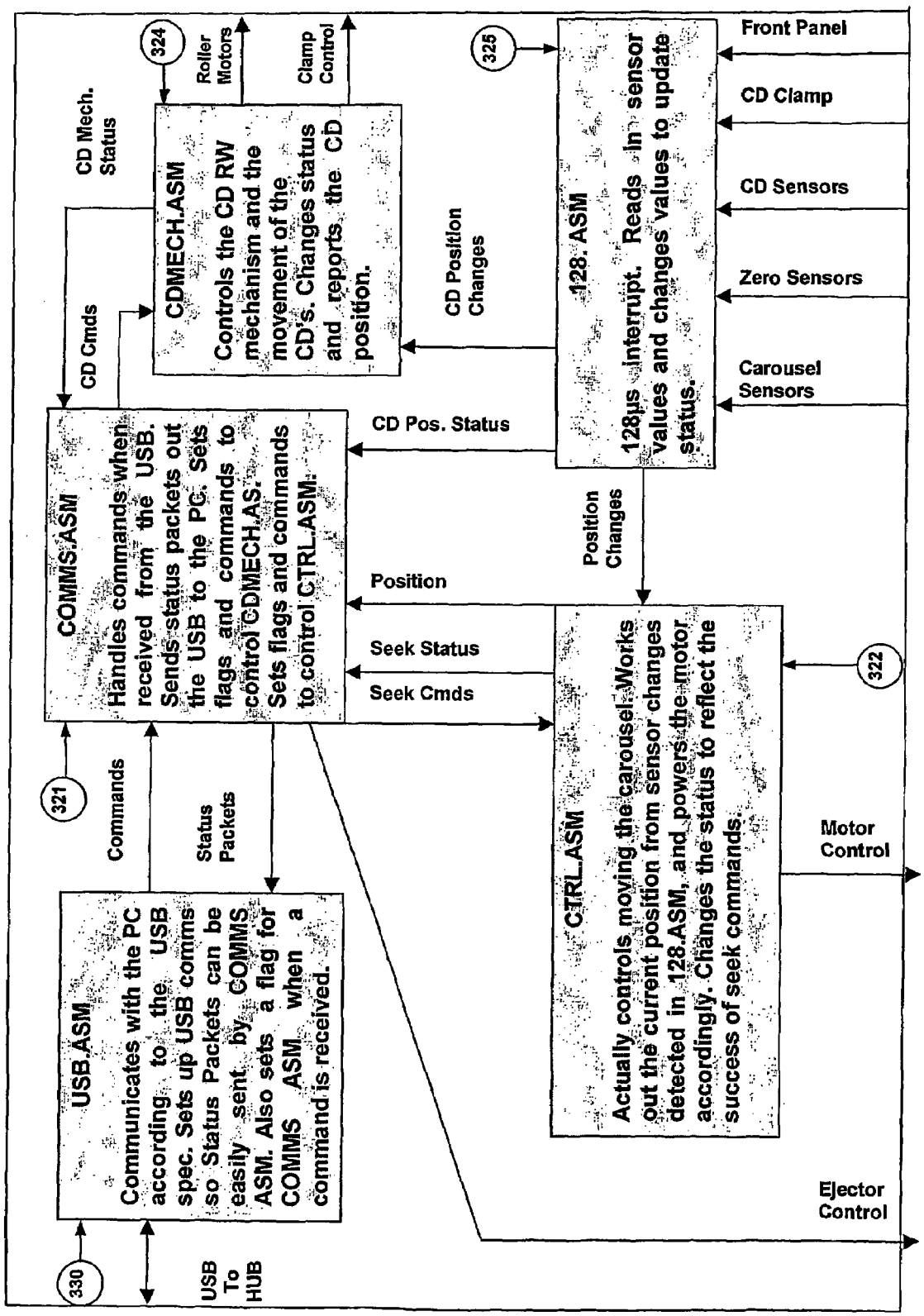
FIG. 29 is a schematic overview showing the functional modules of the processor incorporated into the controller of FIG. 28.

FIG. 29 shows an overview of the software for controlling the processor 150 and includes the following functional modules. A USB.ASM module 330 connects to the USB connector of the computer or to the hub and transfers data from the PC or hub to a COMMS.ASM module 321. This receives commands and data and sets appropriate commands and flags for operation in the processor. The module 321 is connected to a CTRL DOS ASM module 322 which controls movement of the carousel. The module 321 is connected to CD MECH.ASM module 324 which controls the CD read/write mechanism and movement the CD. The module 324 is connected to a 128.AMS module 325 which receives data from the location sensors for determining the position of the carousel 40 and also the clamp status and signals from the front panel of the reader 210. The module 325 is also connected to the module 322.

The embodiment of the invention described with reference to FIG. 13 and onwards in which the reader 210 which enables reading and/or writing onto CDs to be performed provides a number of unique functional advantages.

Firstly, and most importantly, CDs can be stored in the device or stacks of the devices and the stacks coupled to a PC 160 as previously described. This enables the perspective CDs to be accessed from their storage locations in the manner also previously described and read so that the program contained on the CD can be utilised by the PC 160 without the user actually having to touch the CD and locate it in a reader. After the CD has been used it can be again stored away in its storage location 85 within one the storage devices 10. If a number of storage units are stacked one above the other as previously described and each has its own reader a number of CDs can be read to or written into simultaneously under the control of the PC 160. Furthermore, the PC can be used to enable information from one of the CD stored in one of the devices to be written into another of the CDs stored in another of the devices by causing the appropriate CD in one device to be located in the reader 210 associated with that device and another CD located in the reader of another device so that the two readers can interconnect with one another to write data from one reader to the other or to read from one of the CDs.

Because the CDs can be driven in linear fashion through the reader 210 from the storage location and then out of the CD reader through the opening 214 the CDs can be stored away by passing them through the CD reader or return to the operator if the operator does wish to manually use them or, for instance, take a particular CD home with data written onto it for use in a laptop or home PC.

This embodiment of the invention also enables two devices 10 or two stacks of devices 10 to be arranged adjacent one another and connected with different servers or computers and for information to be transmitted from one server to another by transferring CDs from one of the devices 10 associated with one server or computer to another of the devices associated with the other computer or server. This is achieved by arranging the devices 10 so that the openings 14 (if no readers are used) or the openings 214 of readers 210 if the devices 10 are equipped with the readers 210, are directly aligned with one another. One of the devices 10 can therefore be actuated to cause a CD to be ejected from the device either directly from the opening 14 or via the reader 210 and received into the opening 14 or opening 214 of a reader of another of the devices 10.

For example, if the devices are equipped with the readers, when one of the readers is operated so as to cause the rollers 291 and 292 to draw the CD 100 from the storage compartment 285 after the CD has been ejected by ejector lever 96 so that it projects out of the opening 14 The CD can then be driven by the rollers 291 and 292 through the reader 210 and out through the opening 214. As the CD projects out of the opening 214 of one of the readers 210 it will pass into the opening 214 of the other of the readers 10 associated with the other device. As the CD 100 enters that reader it is detected by the photo interrupter 263 which causes the other reader 210 to clamp the CD between the roller 291, 292 and posts 251 and drive the CD into that reader 210. If it is not desired to read the reader and simply transfer it to the other storage device 10 the rollers 291 and 292 are continued to be rotated by the motors 297 and 298 so that a CD is driven completely through the device and into the other storage device 10 where it stored in an appropriate storage compartment 285.

When the CDs 100 are transferred between devices 10, the operating software will monitor the movement of the CDs and should a CD be located in a new storage compartment and a different device 10 will register that storage compartment so that next time the CD is required to be accessed it will know in which device 10 and in which compartment 85 of the device 10 the CD is actually stored.

Interchange of the CDs between devices 10 also has the advantage that not all of the devices need to be supplied with a read/write head. Generally read/write heads are much more expensive than read only heads and therefore if two arrays of stacked CD storage devices 10 are provided only one need be provided with a reader which has both read and write capability. The other could be provided with only read capability so that if it is necessary to write onto a CD the CD can be transferred from the device 10 which does not have the write capability to the read/writer on the CD storage device 10 which does the read/write capability and then returned to storage location in either one of the CD devices 10.

Thus, according to this embodiment of the invention information can be read from any of the CDs in the storage devices 10 or arrays of storage devices 10 and the CDs can be stored in a compartment 85 which can be accessed next time the CD is required. Information can be written between CDs 100 in different storage devices 10 so that data or programs on one CD can be written onto another CD so that duplicate copies can be made should the user wish to take one copy home for use at home whilst at the same time maintaining a record or copy of the data at an office. Thus, information can be transferred between CDs 100 maintained in the storage devices 10 or written onto the CDs from the PC 160.

Since modifications within the spirit and scope of the invention may readily be effected by persons skilled within the art, it is to be understood that this invention is not limited to the particular embodiment described by way of example hereinabove.

The invention claimed is:

1. A storage device for a programmable or programmed medium, said device including;
    a housing;
    a storage member in the housing and having a plurality of storage compartments each for receiving a said medium;
    an outlet opening in the housing through which the medium can pass for location in one of the storage compartments;
    drive means for driving the storage member relative to the housing to present one of the storage compartments and therefore a medium stored in that storage compartment in registry with the opening;
    control means including coupling means for coupling the control means with a computer so that data can be supplied from the coupling means to the computer and received from the computer to operate the control means; and
    wherein a storage medium can be stored in the device by inserting a medium through the opening into one of the storage compartments, the control means determining or providing information as to the compartment in which the medium is stored, so that when the medium is required for operation, an operator can select the medium by input into the computer whereupon information is transmitted to the control means to control the control means to move the storage member relative to the housing to present the required medium to the outlet opening; and
    wherein the device includes a first electrical connector in a base portion of the housing and a second electrical connector in a top portion of the housing, so that a plurality of the devices can be stacked one upon the other with the first electrical connector of one device making electrical connection with the second electrical connector of another of the devices so that data from the computer can be supplied to any one of the devices for controlling the storage member in any one of the devices to present a required storage compartment having the required medium to the outlet opening of the respective device regardless of which of the stacked devices stores the required medium.

2. The device of claim 1 wherein the device includes ejector means for ejecting the medium from the storage compartment when the storage compartment is in registry with the outlet opening.

3. The device of claim 2 wherein the ejector means comprises;
    a lever member; and
    a solenoid, coupled to the control means, for activation by the control means to cause the solenoid to contact the lever and move the lever to push the medium from the storage compartment through the outlet opening.

4. The device of claim 1 wherein the storage member is a rotatable carousel.

5. The device of claim 4 wherein the carousel is rotated by the drive means and the housing remains stationary.

6. The device of claim 5 wherein the carousel is mounted on a plurality of roller wheels.

7. The device of claim 5 wherein the drive means comprises a gear ring arranged about the periphery of the carousel, a worm drive and motor connected to the housing, the worm drive being in mesh with the gear ring, the drive motor being electrically connected to the control means so that the control means can drive the drive motor to rotate the worm drive and therefore rotate the carousel.

8. The device of claim 4 wherein the carousel and housing includes locating means for monitoring the amount of rotation of the carousel, the locating means being coupled to the control means so that the control means receives data as to the position of the carousel so the carousel can be driven to present the required storage compartment in registry with the opening.

9. The device of claim 2 including a holder for receiving the medium when the medium is ejected by the ejector through the outlet opening.

10. The device of claim 1 including a reader for receiving the selected medium for reading from and/or writing onto the storage medium without the user having to remove the medium and locate the medium in a reader associated with the computer.

11. The device of claim 10 wherein the reader is electrically coupled to the coupling means so that data can be supplied from the reader or to the reader from the coupling means and to and from the coupling means to the computer.

12. The device of claim 10 wherein the reader includes a first entry opening so that medium can be supplied from a storage compartment to the reader, and a second entry opening so that the medium can be located into the device and compartment through the second entry opening of the reader and then through the first entry opening of the reader into a storage compartment, and whereupon when it is desired to read the medium or write onto the medium the drive means rotates the carousel to present the required storage compartment and therefore the required medium to the opening in the housing and the ejector means ejects the medium from the compartment through the opening of the housing, through the first entry opening of the reader and into the reader for reading.

13. The device of claim 12 wherein the reader includes medium drive means for selectively driving the medium from the first or second entry opening into the reader for reading or writing by the reader or from the first opening through the reader to the second opening, or from the second opening through the reader to the first entry opening.

14. The device of claim 4 including an ejector means for ejecting a medium from the carousel the ejector means being located beneath the carousel and the carousel has a plurality of holes registering with each of the compartments so that when the ejector means is operated the lever can move through one of the holes to make contact with the medium and therefore push the medium from the storage compartment to the opening of the housing.

15. The device of claim 4 wherein the carousel includes a first carousel portion having a plurality of ribs which define spaces therebetween, the spaces forming each of the storage compartments, and a second carousel portion also including a plurality of ribs which are in alignment with the plurality of ribs on the first portion and between which are defined spaces, the spaces of the first carousel portion and the spaces of the second carousel portion defining the storage compartments so the storage medium can be located in one of the compartments by parts of the storage medium locating in one of the spaces of the first carousel portion and the aligned space of the second carousel portion.

16. The device of claim 15 wherein the first and second carousel portions have a central hub which connect together to join the first and second portions together.

17. The device of claim 16 wherein carousel portions include upstanding posts at a peripheral portion of the carousel for supporting the peripheral portion of the first and second carousel portions with respect to one another.

18. A storage device for a programmable or programmed medium, said device including:
   a housing;
   a storage member in the housing and having a plurality of storage compartments each for receiving a said medium;
   an outlet opening in the housing through which the medium can pass for location in one of the storage compartments;
   drive means for driving the storage member relative to the housing to present one of the storage compartments and therefore a medium stored in that storage compartment in registry with the opening;
   control means including coupling means for coupling the control means with a computer so that data can be supplied from the coupling means to the computer and received from the computer to operate the control means; and
   ejector means for ejecting the medium from the storage compartment when the storage compartment is in registry with the outlet opening, the ejector means comprising:
   a lever member; and
   a solenoid, coupled to the control means, for activation by the control means to cause the solenoid to contact the lever and move the lever to push the medium from the storage compartment through the outlet opening,
   wherein a storage medium can be stored in the device by inserting a medium through the opening into one of the storage compartments, the control means determining or providing information as to the compartment in which the medium is stored, so that when the medium is required for operation, an operator can select the medium by input into the computer whereupon information is transmitted to the control means to control the control means to move the storage member relative to the housing to present the required medium to the outlet opening.

19. The device of claim 18 wherein the storage member is a rotatable carousel.

20. The device of claim 18 wherein the carousel is rotated by the drive means and the housing remains stationary.

21. The device of claim 20 wherein the carousel is mounted on a plurality of roller wheels.

22. The device of claim 20 wherein the drive means comprises a gear ring arranged about the periphery of the carousel, a worm drive and motor connected to the housing, the worm drive being in mesh with the gear ring, the drive motor being electrically connected to the control means so that the control means can drive the drive motor to rotate the worm drive and therefore rotate the carousel.

23. The device of claim 19 wherein the carousel and housing includes locating means for monitoring the amount of rotation of the carousel, the locating means being coupled to the control means so that the control means receives data as to the position of the carousel so the carousel can be driven to-present the required storage compartment in registry with the opening.

24. The device of claim 18 wherein the device includes a first electrical connector in a base portion of the housing and a second electrical connector in a top portion of the housing, so that a plurality of the devices can be stacked one upon the other with the first electrical connector of one device making electrical connection with the second electrical connector of another of the devices so that data from the computer can be supplied to any one of the devices for controlling the storage member in any one of the devices to present a required storage compartment having the required medium to the outlet opening of the respective device regardless of which of the stacked devices stores the required medium.

25. The device of claim 19 including a holder for receiving the medium when the medium is ejected by the ejector through the outlet opening.

26. The device of claim 18 including a reader for receiving the selected medium for reading from and/or writing onto the storage medium without the user having to remove the medium and locate the medium in a reader associated with the computer.

27. The device of claim 26 wherein the reader is electrically coupled to the coupling means so that data can be supplied from the reader or to the reader from the coupling means and to and from the coupling means to the computer.

28. The device of claim 26 wherein the reader includes a first entry opening so that medium can be supplied from a storage compartment to the reader, and a second entry opening so that the medium can be located into the device and compartment through the second entry opening of the reader and then through the first entry opening of the reader into a storage compartment, and whereupon when it is desired to read the medium or write onto the medium the drive means rotates the carousel to present the required storage compartment and therefore the required medium to the opening in the housing and the ejector means ejects the medium from the compartment through the opening of the housing, through the first entry opening of the reader and into the reader for reading.

29. The device of claim 28 wherein the reader includes medium drive means for selectively driving the medium from the first or second entry opening into the reader for reading or writing by the reader or from the first opening through the reader to the second opening, or from the second opening through the reader to the first entry opening.

30. The device of claim 19 including an ejector means for ejecting a medium from the carousel the ejector means being located beneath the carousel and the carousel has a plurality of holes registering with each of the compartments so that when the ejector means is operated the lever can move through one of the holes to make contact with the medium and therefore push the medium from the storage compartment to the opening of the housing.

31. The device of claim 19 wherein the carousel includes a first carousel portion having a plurality of ribs which define spaces therebetween, the spaces forming each of the storage compartments, and a second carousel portion also including a plurality of ribs which are in alignment with the plurality of ribs on the first portion and between which are defined spaces, the spaces of the first carousel portion and the spaces of the second carousel portion defining the storage compartments so the storage medium can be located in one of the compartments by parts of the storage medium locating in one of the spaces of the first carousel portion and the aligned space of the second carousel portion.

32. The device of claim 31 wherein the first and second carousel portions have a central hub which connect together to join the first and second portions together.

33. The device of claim 32 wherein carousel portions include upstanding posts at a peripheral portion of the carousel for supporting the peripheral portion of the first and second carousel portions with respect to one another.

34. A storage device for a programmable or programmed medium, said device including:
a housing;
a rotatable carousel in the housing and having a plurality of storage compartments each for receiving a said medium;
an outlet opening in the housing through which the medium can pass for location in one of the storage compartments;
drive means for rotating the carousel relative to the housing to present one of the storage compartments and therefore a medium stored in that storage compartment in registry with the opening,
the drive means comprising a gear ring arranged about the periphery of the carousel, a worm drive and motor connected to the housing, the worm drive being in mesh with the gear ring, the drive motor being electrically connected to the control means so that the control means can drive the drive motor to rotate the worm drive and therefore rotate the carousel; and
control means including coupling means for coupling the control means with a computer so that data can be supplied from the coupling means to the computer and received from the computer to operate the control means,
wherein a storage medium can be stored in the device by inserting a medium through the opening into one of the storage compartments, the control means determining or providing information as to the compartment in which the medium is stored, so that when the medium is required for operation, an operator can select the medium by input into the computer whereupon information is transmitted to the control means to control the control means to rotate the carousel relative to the housing to present the required medium to the outlet opening.

35. The device of claim 34 wherein the device includes ejector means for ejecting the medium from the storage compartment when the storage compartment is in registry with the outlet opening.

36. The device of claim 35 wherein the ejector means comprises:
a lever member; and
a solenoid, coupled to the control means, for activation by the control means to cause the solenoid to contact the lever and move the lever to push the medium from the storage compartment through the outlet opening.

37. The device of claim 34 wherein the carousel is mounted on a plurality of roller wheels.

38. The device of claim 34 wherein the carousel and housing includes locating means for monitoring the amount of rotation of the carousel, the locating means being coupled to the control means so that the control means receives data as to the position of the carousel so the carousel can be driven to-present the required storage compartment in registry with the opening.

39. The device of claim 34 wherein the device includes a first electrical connector in a base portion of the housing and a second electrical connector in a top portion of the housing, so that a plurality of the devices can be stacked one upon the other with the first electrical connector of one device making electrical connection with the second electrical connector of another of the devices so that data from the computer can be supplied to any one of the devices for controlling the carousel in any one of the devices to present a required storage compartment having the required medium to the outlet opening of the respective device regardless of which of the stacked devices stores the required medium.

40. The device of claim 35 including a holder for receiving the medium when the medium is ejected by the ejector through the outlet opening.

41. The device of claim 34 including a reader for receiving the selected medium for reading from and/or writing onto the storage medium without the user having to remove the medium and locate the medium in a reader associated with the computer.

42. The device of claim 41 wherein the reader is electrically coupled to the coupling means so that data can be supplied from the reader or to the reader from the coupling means and to and from the coupling means to the computer.

43. The device of claim 41 wherein the reader includes a first entry opening so that medium can be supplied from a storage compartment to the reader, and a second, entry opening so that the medium can be located into the device and compartment through the second entry opening of the reader and then through the first entry opening of the reader into a storage compartment, and whereupon when it is desired to read the medium or write onto the medium the drive means rotates the carousel to present the required storage compartment and therefore the required medium to the opening in the housing and the ejector means ejects the medium from the compartment through the opening of the housing, through the first entry opening of the reader and into the reader for reading.

44. The device of claim 43 wherein the reader includes medium drive means for selectively driving the medium from the first or second entry opening into the reader for reading or writing by the reader or from the first opening through the reader to the second opening, or from the second opening through the reader to the first entry opening.

45. The device of claim 34 including an ejector means for ejecting a medium from the carousel the ejector means being located beneath the carousel and the carousel has a plurality of holes registering with each of the compartments so that when the ejector means is operated the lever can move through one of the holes to make contact with the medium and therefore push the medium from the storage compartment to the opening of the housing.

46. The device of claim 34 wherein the carousel includes a first carousel portion having a plurality of ribs which define spaces therebetween, the spaces forming each of the storage compartments, and a second carousel portion also including a plurality of ribs which are in alignment with the plurality of ribs on the first portion and between which are defined spaces, the spaces of the first carousel portion and the spaces of the second carousel portion defining the storage compartments so the storage medium can be located in one of the compartments by parts of the storage medium locating in one of the spaces of the first carousel portion and the aligned space of the second carousel portion.

47. The device of claim 46 wherein the first and second carousel portions have a central hub which connect together to join the first and second portions together.

48. The device of claim 47 wherein carousel portions include upstanding posts at a peripheral portion of the carousel for supporting the peripheral portion of the first and second carousel portions with respect to one another.

49. A storage device for a programmable or programmed medium, said device including:
a housing;
a storage member in the housing and having a plurality of storage compartments each for receiving a said medium;

an outlet opening in the housing through which the medium can pass for location in one of the storage compartments;

drive means for driving the storage member relative to the housing to present one of the storage compartments and therefore a medium stored in that storage compartment in registry with the opening;

control means including coupling means for coupling the control means with a computer so that data can be supplied from the coupling means to the computer and received from the computer to operate the control means; and a reader for receiving the selected medium for reading from and/or writing onto the storage medium without the user having to remove the medium and locate the medium in a reader associated with the computer, the reader including a first entry opening so that medium can be supplied from a storage compartment to the reader, and a second entry opening so that the medium can be located into the device and compartment through the second entry opening of the reader and then through the first entry opening of the reader into a storage compartment, and whereupon when it is desired to read the medium or write onto the medium the drive means rotates the carousel to present the required storage compartment and therefore the required medium to the opening in the housing and the ejector means ejects the medium from the compartment through the opening of the housing, through the first entry opening of the reader and into the reader for reading, wherein a storage medium can be stored in the device by inserting a medium through the opening into one of the storage compartments, the control means determining or providing information as to the compartment in which the medium is stored, so that when the medium is required for operation, an operator can select the medium by input into the computer whereupon information is transmitted to the control means to control the control means to move the storage member relative to the housing to present the required medium to the outlet opening.

50. The device of claim 49 wherein the device includes ejector means for ejecting the medium from the storage compartment when the storage compartment is in registry with the outlet opening.

51. The device of claim 50 wherein the ejector means comprises;
a lever member; and
a solenoid, coupled to the control means, for activation by the control means to cause the solenoid to contact the lever and move the lever to push the medium from the storage compartment through the outlet opening.

52. The device of claim 49 wherein the storage member is a rotatable carousel.

53. The device of claim 52 wherein the carousel is rotated by the drive means and the housing remains stationary.

54. The device of claim 53 wherein the carousel is mounted on a plurality of roller wheels.

55. The device of claim 53 wherein the drive means comprises a gear ring arranged about the periphery of the carousel, a worm drive and motor connected to the housing, the worm drive being in mesh with the gear ring, the drive motor being electrically connected to the control means so that the control means can drive the drive motor to rotate the worm drive and therefore rotate the carousel.

56. The device of claim 52 wherein the carousel and housing includes locating means for monitoring the amount of rotation of the carousel, the locating means being coupled to the control means so that the control means receives data as to the position of the carousel so the carousel can be driven to present the required storage compartment in registry with the opening.

57. The device of claim 49 wherein the device includes a first electrical connector in a base portion of the housing and a second electrical connector in a top portion of the housing, so that a plurality of the devices can be stacked one upon the other with the first electrical connector of one device making electrical connection with the second electrical connector of another of the devices so that data from the computer can be supplied to any one of the devices for controlling the storage member in any one of the devices to present a required storage compartment having the required medium to the outlet opening of the respective device regardless of which of the stacked devices stores the required medium.

58. The device of claim 50 including a holder for receiving the medium when the medium is ejected by the ejector through the outlet opening.

59. The device of claim 49 wherein the reader is electrically coupled to the coupling means so that data can be supplied from the reader or to the reader from the coupling means and to and from the coupling means to the computer.

60. The device of claim 49 wherein the reader includes medium drive means for selectively driving the medium from the first or second entry opening into the reader for reading or writing by the reader or from the first opening through the reader to the second opening, or from the second opening through the reader to the first entry opening.

61. The device of claim 52 including an ejector means for ejecting a medium from the carousel the ejector means being located beneath the carousel and the carousel has a plurality of holes registering with each of the compartments so that when the ejector means is operated the lever can move through one of the holes to make contact with the medium and therefore push the medium from the storage compartment to the opening of the housing.

62. The device of claim 52 wherein the carousel includes a first carousel portion having a plurality of ribs which define spaces therebetween, the spaces forming each of the storage compartments, and a second carousel portion also including a plurality of ribs which are in alignment with the plurality of ribs on the first portion and between which are defined spaces, the spaces of the first carousel portion and the spaces of the second carousel portion defining the storage compartments so the storage medium can be located in one of the compartments by parts of the storage medium locating in one of the spaces of the first carousel portion and the aligned space of the second carousel portion.

63. The device of claim 62 wherein the first and second carousel portions have a central hub which connect together to join the first and second portions together.

64. The device of claim 63 wherein carousel portions include upstanding posts at a peripheral portion of the carousel for supporting the peripheral portion of the first and second carousel portions with respect to one another.

* * * * *